(12) United States Patent
Teraji et al.

(10) Patent No.: US 7,216,623 B2
(45) Date of Patent: May 15, 2007

(54) INTERNAL COMBUSTION ENGINE WITH AUXILIARY COMBUSTION CHAMBER

(75) Inventors: Atsushi Teraji, Yokohama (JP); Kaori Arai, Yokohama (JP); Eiji Takahashi, Yokosuka (JP); Toru Nodai, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 11/268,534

(22) Filed: Nov. 8, 2005

(65) Prior Publication Data

US 2006/0130804 A1    Jun. 22, 2006

(30) Foreign Application Priority Data

Dec. 22, 2004   (JP) ............................. 2004-371567

(51) Int. Cl.
  *F02B 19/12*   (2006.01)
(52) U.S. Cl. .................. 123/256; 123/253; 123/260
(58) Field of Classification Search ................ 123/253, 123/260, 263, 266, 278–293, 256
  See application file for complete search history.

(56) References Cited

U.S. PATENT DOCUMENTS 4,038,959 A * 8/1977 Takizawa et al. ........... 123/256
4,180,021 A * 12/1979 Yanagihara ................ 123/260
6,854,439 B2 * 2/2005 Regueiro .................. 123/263
7,066,137 B1 * 6/2006 Dawson .................... 123/266
2005/0205050 A1   9/2005 Kubo et al.

FOREIGN PATENT DOCUMENTS

JP       60-45716 A     3/1985

* cited by examiner

*Primary Examiner*—Stephen K. Cronin
*Assistant Examiner*—Johnny H. Hoang
(74) *Attorney, Agent, or Firm*—Global IP Counselors, LLP

(57) ABSTRACT

An internal combustion engine comprises a main combustion chamber part, an auxiliary combustion chamber part, a first communicating passage, a second communicating passage and an igniting component. The auxiliary combustion chamber part includes first and second auxiliary combustion chambers. The first auxiliary combustion chamber is disposed adjacent to the main combustion chamber part. The second auxiliary combustion chamber is disposed adjacent to the first auxiliary combustion chamber at a position further away from the main combustion chamber part. The first communicating passage extends between the main combustion chamber part and the first auxiliary combustion chamber and the second communicating passage extends between the first auxiliary combustion chamber and the second auxiliary combustion chamber. The ignition component is configured and arranged to ignite fresh air-fuel mixture introduced from the main combustion chamber into the first auxiliary combustion chamber through the first communicating passage.

16 Claims, 11 Drawing Sheets

INTERNAL COMBUSTION ENGINE WITH AUXILIARY COMBUSTION CHAMBER

CROSS-REFERENCE TO RELATED APPLICATIONS

This application claims priority under 35 U.S.C. § 119 to Japanese Patent Application No. 2004-371567. The entire disclosure of Japanese Patent Application No. 2004-371567 is hereby incorporated herein by reference.

BACKGROUND OF THE INVENTION

1. Field of the Invention

The present invention relates to an internal combustion engine with an auxiliary combustion chamber. More specifically, the present invention relates to an internal combustion engine in which each cylinder has a main chamber part and an auxiliary combustion chamber part.

2. Background Information

Japanese Laid-Open Patent Application Publication No. 60-45716 discloses a conventional internal combustion engine with auxiliary combustion chamber in which each cylinder has a main combustion chamber and an auxiliary combustion chamber. In this conventional internal combustion engine with an auxiliary combustion chamber, the auxiliary combustion chamber is disposed adjacent to the main combustion chamber.

In view of the above, it will be apparent to those skilled in the art from this disclosure that there exists a need for an improved internal combustion engine with an auxiliary combustion chamber. This invention addresses this need in the art as well as other needs, which will become apparent to those skilled in the art from this disclosure.

SUMMARY OF THE INVENTION

It has been discovered that in the above mentioned conventional internal combustion engine, residual gas remains in the auxiliary combustion chamber after combustion. This residual gas in the auxiliary combustion chamber sometimes causes unstable ignition in the auxiliary combustion chamber.

Therefore, one object of the present invention is to provide an internal combustion engine with an auxiliary combustion chamber in which ignition in the auxiliary combustion chamber can be stabilized.

In order to achieve the above object and other objects of the present invention, an internal combustion engine is provided that comprises a main combustion chamber part, an auxiliary combustion chamber part, at least one first communicating passage, a second communicating passage and an igniting component. The auxiliary combustion chamber part includes a first auxiliary combustion chamber and a second auxiliary combustion chamber. The first auxiliary combustion chamber is disposed adjacent to the main combustion chamber part. The second auxiliary combustion chamber is disposed adjacent to the first auxiliary combustion chamber at a position further away from the main combustion chamber part with respect to the first auxiliary combustion chamber. The at least one first communicating passage extends between the main combustion chamber part and the first auxiliary combustion chamber so that the main combustion chamber part and the first auxiliary combustion chamber are fluidly communicated. The second communicating passage extends between the first auxiliary combustion chamber and the second auxiliary combustion chamber so that the first auxiliary combustion chamber and the second auxiliary combustion chamber are fluidly communicated. The ignition component is coupled to the auxiliary combustion chamber part, and configured and arranged to ignite fresh air-fuel mixture introduced from the main combustion chamber into the first auxiliary combustion chamber through the first communicating passage.

These and other objects, features, aspects and advantages of the present invention will become apparent to those skilled in the art from the following detailed descriptions, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
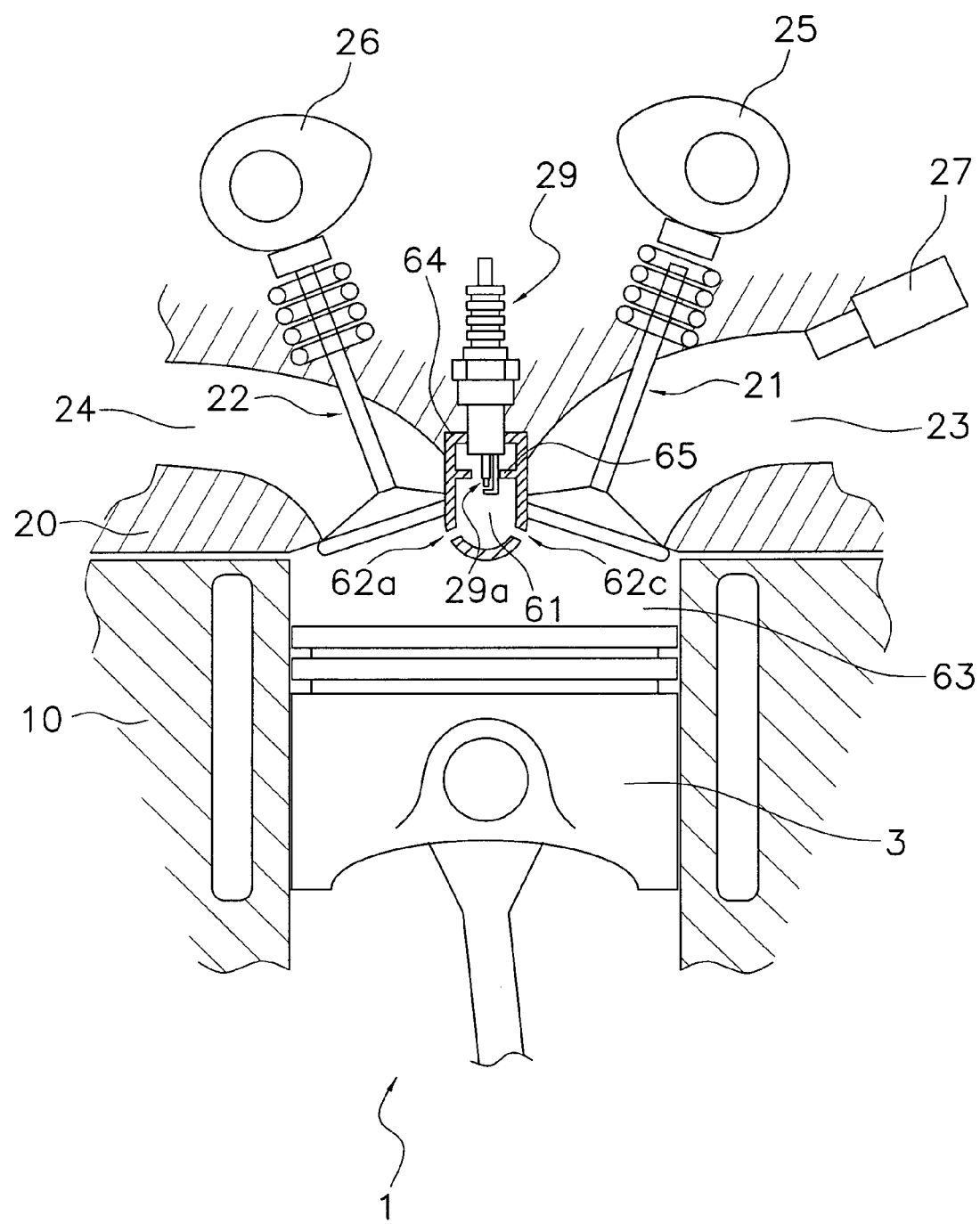
FIG. 1 is a simplified partial cross sectional view of an internal combustion engine having a main combustion part and an auxiliary combustion chamber part in accordance with a first embodiment of the present invention.

Referring initially to FIGS. 1 to 6, the structure and operation of an internal combustion engine 1 is illustrated in accordance with the first embodiment of the present invention. FIG. 1 is a simplified cross sectional view of the internal combustion engine 1. It will be apparent to those skilled in the art from this disclosure that each of the subsequent embodiments of the present invention can be installed in an engine having a similar structure to the engine 1 illustrated in FIG. 1. Thus, the internal combustion engine 1 will only be described with reference to the first embodiment and will not be discussed in each of the subsequent embodiments of the present invention.

Structure of Internal Combustion Engine

Figure 2:
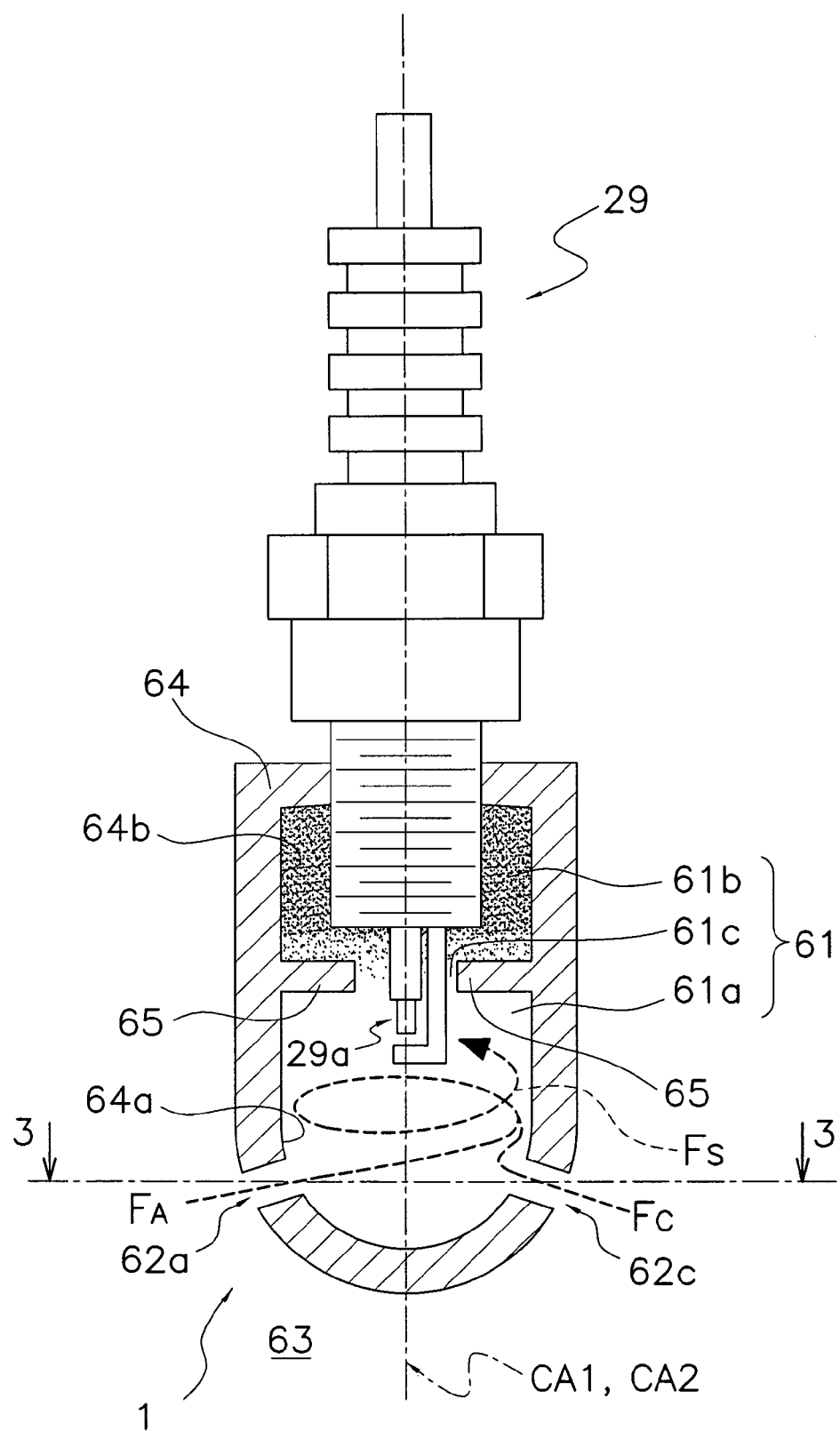
FIG. 2 is an enlarged partial cross sectional view of the auxiliary combustion chamber part of the internal combustion engine coupled with a spark plug in accordance with the first embodiment of the present invention.

As shown in FIG. 1, the internal combustion engine 1 basically comprises a plurality of pistons 3 (only one shown in FIG. 1) reciprocally mounted in a cylinder block 10, and a cylinder head 20 secured to the cylinder block 10. The cylinder block 10 and a cylinder head 20 define a plurality of cylinders (only one cylinder shown in FIG. 1). Each cylinder of the internal combustion engine 1 includes an intake valve 21, an exhaust valve 22, an intake port 23, an exhaust port 24, an intake cam 25, an exhaust cam 26, a fuel injection valve 27 and a spark plug 29 (ignition component). Each cylinder of the internal combustion engine 1 includes a main combustion chamber part 63, a preliminary or auxiliary combustion chamber part 61, and a plurality of first communicating passages 62a to 62d (only two first communicating passages 62a and 62c are shown in FIG. 1). Moreover, The main combustion chamber part 63 is defined by the cylinder block 10, the cylinder head 20, and the piston 3 as shown in FIG. 1. The auxiliary combustion chamber part 61 is disposed adjacent to the main combustion chamber part 63, and is formed by an auxiliary combustion chamber wall 64. In the first embodiment of the present invention, the auxiliary combustion chamber part 61 preferably has a substantially cylindrical shape with a first center axis CA1 (FIG. 2). Also, the auxiliary combustion chamber part 61 has a hemispherical bottom portion that bulges out downwardly from a cylindrical body of the auxiliary combustion chamber part 61 as shown in FIG. 1.

The spark plug 29 includes a distal end portion 29a that protrudes into the auxiliary combustion chamber part 61. The first communicating passages 62a to 62d are formed in the hemispherical bottom portion of the auxiliary combustion chamber part 61 as being spaced apart about the first center axis CA1. The first communicating passages 62a to 62d are configured and arranged such that the main combustion chamber part 63 is fluidly communicated with the auxiliary combustion chamber part 61 via the first communicating passages 62a to 62d.

The intake port 23 and the exhaust port 24 are each formed in the cylinder head 20. The intake valve 21 is located in a downstream portion of the intake port 23 to regulate intake air flowing into the main combustion chamber part 63. The exhaust valve 22 is located in an upstream portion of the exhaust port 24 to regulate exhaust gases flowing from the main combustion chamber part 63. The intake cam 25 and the exhaust cam 26 are disposed at upper end portions of the intake valve 21 and the exhaust valve 22, respectively. The intake cam 25 and the exhaust cam 26 are configured and arranged to rotate along with a crankshaft (not shown) of the internal combustion engine 1, thereby opening and closing the intake valve 21 and the exhaust valve 22, respectively, in a conventional manner. The fuel injection valve 27 is preferably coupled to the intake port 23 so that a distal end of the fuel injection valve 27 protrudes into the intake port 23. Thus, fuel is injected from the fuel injection valve 27 into the intake port 23.

Detailed Structure of Auxiliary Combustion Chamber Part

FIG. 2 is an enlarged cross sectional view of the auxiliary combustion chamber part 61 that is coupled with the spark plug 29 as taken along the first center axis CA1 of the auxiliary combustion chamber part 61. As seen in FIG. 2, the auxiliary combustion chamber part 61 includes a baffle plate (divider element) 65 coupled to the auxiliary combustion chamber wall 64. The baffle plate 65 is configured and arranged to divide the auxiliary combustion chamber part 61 into a first auxiliary combustion chamber 61a and a second auxiliary combustion chamber 61b. The first auxiliary combustion chamber 61a and the second auxiliary combustion chamber 61b are fluidly communicated via a second communicating passage 61c, which is defined by an opening portion formed in the baffle plate 65.

The first auxiliary combustion chamber 61a is provided adjacent to the main combustion chamber part 63, and is formed by the auxiliary combustion chamber wall 64 and the baffle plate 65. The first auxiliary combustion chamber 61a is substantially circular in a cross section perpendicular to the first center axis CA1. In other words, the first auxiliary combustion chamber 61a has a substantially cylindrical shape about the first center axis CA1. Moreover, the first auxiliary combustion chamber 61a includes the hemispherical bottom portion where the first communicating passages 62a to 62b are formed. The first communicating passages 62a to 62d are formed in the auxiliary combustion chamber wall 64 of the first auxiliary combustion chamber 61a so that the first auxiliary combustion chamber 61a is fluidly communicated with the main combustion chamber part 63 via the first communicating passages 62a to 62d.

The second auxiliary combustion chamber 61b is disposed adjacent to the first auxiliary combustion chamber 61a at a position further away from the main combustion chamber part 63 with respect to the first auxiliary combustion chamber 61a. The second auxiliary combustion chamber 61b is formed by the auxiliary combustion chamber wall 64 and the baffle plate 65. The second auxiliary combustion chamber 61b is substantially cylindrical with a second center axis CA2. In this embodiment of the present invention, the second center axis CA2 of the second auxiliary combustion chamber 61b substantially coincides with the first center axis CA1 of the first auxiliary combustion chamber 61a as shown in FIG. 2.

As mentioned above, the baffle plate 65 divides the auxiliary combustion chamber part 61 into the first auxiliary combustion chamber 61a and the second auxiliary combustion chamber 61b. The baffle plate 65 is a generally plate shaped member with the opening portion formed in a center portion (near the first and second center axes CA1 and CA2) thereof, which defines the second communicating passage 61c.

The auxiliary combustion chamber part 61 is arranged such that a volume of the first auxiliary combustion chamber 61a is greater than a volume of the second auxiliary combustion chamber 61b. Moreover, since residual gas in the auxiliary combustion chamber part 61 is believed to be compressed during compression stroke at a proportion of an effective compression ratio of the internal combustion engine 1, the auxiliary combustion chamber part 61 is arranged such that an auxiliary chamber volumetric ratio is substantially equal to the effective compression ratio of the internal combustion engine 1. The auxiliary chamber volumetric ratio is obtained by adding the volume of the first auxiliary combustion chamber 61a and the volume of the second auxiliary combustion chamber 61b, and dividing the sum by the volume of the second auxiliary combustion chamber 61b. The volumes of the first auxiliary combustion chamber 61a and the second auxiliary combustion chamber 61b do not include a volume of a portion of the first auxiliary combustion chamber 61a or the second auxiliary combustion chamber 61b taken up by the spark plug 29.

As mentioned above, the second communicating passage 61c is defined by the opening portion formed in the baffle plate 65 near the first center axis CA1. The second communicating passage 61c is configured and arranged such the first auxiliary combustion chamber 61a is fluidly communicated with the second auxiliary combustion chamber 61b via the second communicating passage 61c.

As seen in FIG. 2, the spark plug 29 extends from a top portion of the second auxiliary combustion chamber part 61b toward the first auxiliary combustion chamber 61a passing through the second communicating passage 61c. The distal end portion 29a of the spark plug 29 is disposed in the first auxiliary combustion chamber 61a at a portion across from the first communicating passages 62a to 62d. More specifically, the distal end portion 29a of the spark plug 29 is located away from the main combustion chamber part 63 and near the first center axis CA1 of the first auxiliary combustion chamber 61a in the interior of the first auxiliary combustion chamber 61a. The distal end portion 29a of the spark plug 29 protrudes into the first auxiliary combustion chamber 61a as shown in FIG. 2.

Figure 3:
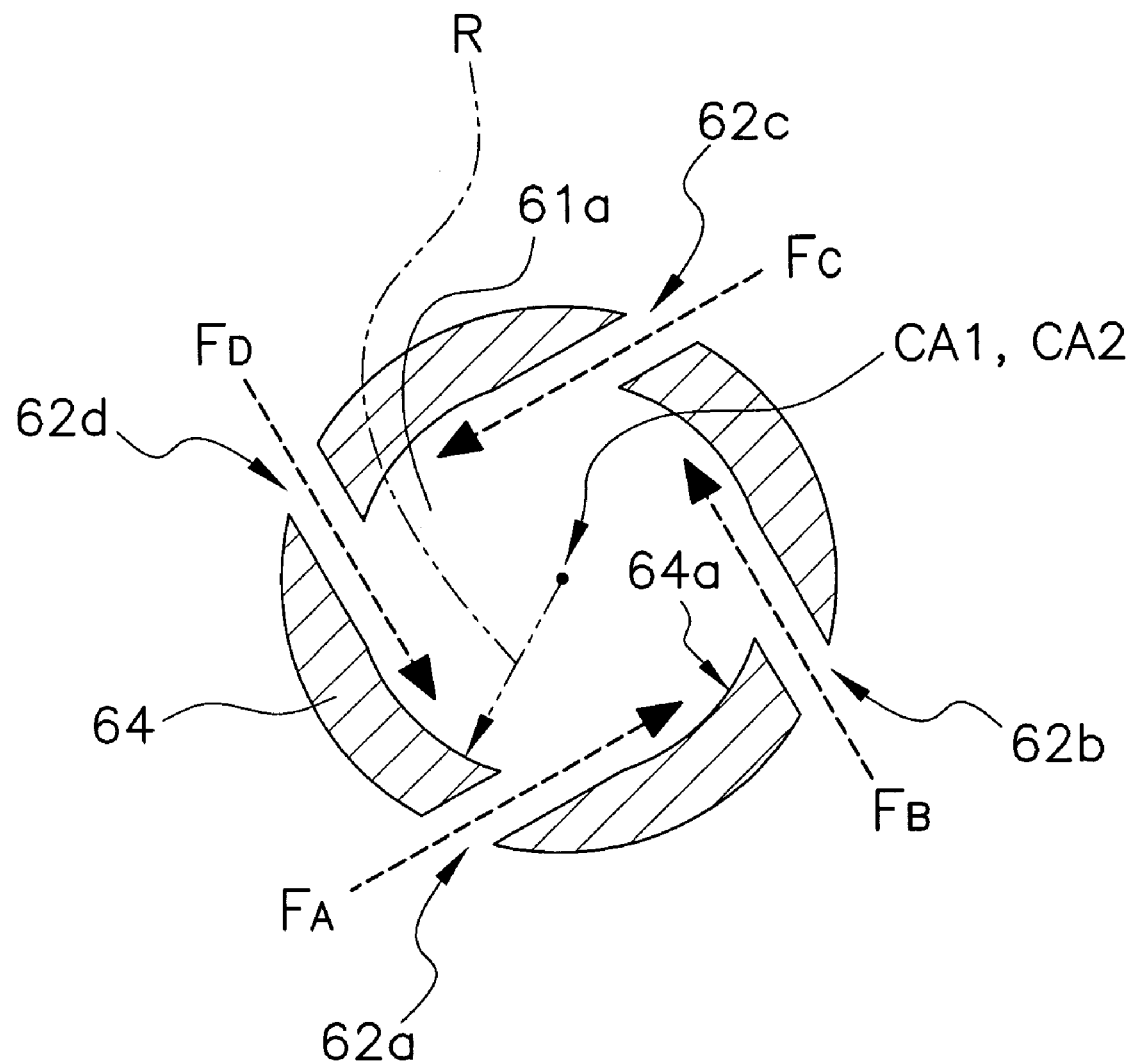
FIG. 3 is an enlarged cross sectional view of the auxiliary combustion chamber part of the internal combustion engine taken along a section line 3—3 in FIG. 2 in accordance with the first embodiment of the present invention.

FIG. 3 is a cross sectional view of the auxiliary combustion chamber part 61 as taken along a section line 3—3 in FIG. 2. As shown in FIG. 3, the first communicating passages 62a to 62d are formed in the auxiliary combustion chamber wall 64 of the first auxiliary combustion chamber 61a. The first communicating passages 62a to 62d are formed in portions of the auxiliary combustion chamber wall 64 that are offset with respect to the first center axis CA1 of the first auxiliary combustion chamber 61a in a cross sectional view perpendicular to a cylinder axis (not shown). In the first embodiment of the present invention, the cylinder axis of the internal combustion engine 1 is substantially parallel to the first center axis CA1 of the first auxiliary combustion chamber 61a. Thus, FIG. 3 illustrates a cross sectional view perpendicular to the cylinder axis in accordance with the first embodiment of the present invention.

Moreover, center axes of the first communicating passages 62a to 62d are inclined with respect to a radial direction R of the auxiliary combustion chamber part 61 as shown in FIG. 3. The radial direction R used herein is a direction extending radially from the first center axis CA1 of the first auxiliary combustion chamber 61a in a cross sectional view perpendicular to the cylinder axis.

Simplified Operation of Internal Combustion Engine

With the internal combustion engine 1, fuel is injected from the fuel injection valve 27 into fresh air introduced into the intake port 23 to form a fresh air-fuel mixture. During the intake stroke, the intake valve 21 is opened by the intake cam 25, and the fresh air-fuel mixture is introduced from the intake port 23 into the main combustion chamber part 63. The fresh air-fuel mixture introduced from the intake port 23 is substantially homogeneous in the main combustion chamber part 63.

During the compression stroke, the fresh air-fuel mixture is compressed in the main combustion chamber part 63, and part of the homogeneous fresh air-fuel mixture of the main combustion chamber part 63 is introduced from the main combustion chamber part 63, through the first communicating passages 62a to 62d, into the auxiliary combustion chamber part 61.

In the auxiliary combustion chamber part 61, the fresh air-fuel mixture is spark-ignited at a specific timing by the distal end portion 29a of the spark plug 29. The spark-ignited combustion gas (hereinafter referred to as flame) radiates out in a generally torch shape from the auxiliary combustion chamber part 61 through the first communicating passages 62a to 62d to the main combustion chamber part 63. The homogeneous fresh air-fuel mixture in the main combustion chamber part 63 is torch-ignited and combusted by the flame radiated from the auxiliary combustion chamber part 61.

During the expansion stroke, the piston 3 is pushed down by the combustion pressure generated by the combustion of the homogeneous fresh air-fuel mixture in the main combustion chamber part 63. During the exhaust stroke, the exhaust valve 22 is opened by the exhaust cam 26, and the gas that has been combusted in the main combustion chamber part 63 (hereinafter referred as combusted gas) is discharged from the main combustion chamber part 63 into the exhaust port 24.

Detailed Operation of Auxiliary Combustion Chamber

As shown in FIGS. 2 and 3, during the compression stroke, the homogeneous fresh air-fuel mixture is introduced as fresh air-fuel mixture flows $F_A$ to $F_D$ from the main combustion chamber part 63 into the auxiliary combustion chamber part 61 through the first communicating passages 62a to 62d, respectively. As mentioned above, the first communicating passages 62a to 62d are formed in the portions of the auxiliary combustion chamber wall 64 that are offset with respect to the first center axis CA1 of the first auxiliary combustion chamber 61a as shown in FIG. 3. Moreover, the first communicating passages 62a to 62d are inclined with respect to the radial direction R of the auxiliary combustion chamber part 61. The auxiliary combustion chamber part 61 is substantially cylindrical in shape. Accordingly, flows $F_A$, $F_B$, $F_C$ and $F_D$ (FIG. 3) of the fresh air-fuel mixture introduced to the auxiliary combustion chamber part 61 from the first communicating passages 62a, 62b, 62c, 62d, respectively, form a swirl flow $F_S$ along an inner peripheral surface 64a of the first auxiliary combustion chamber 61a as indicated by the dotted arrow in FIG. 2.

Figure 4:
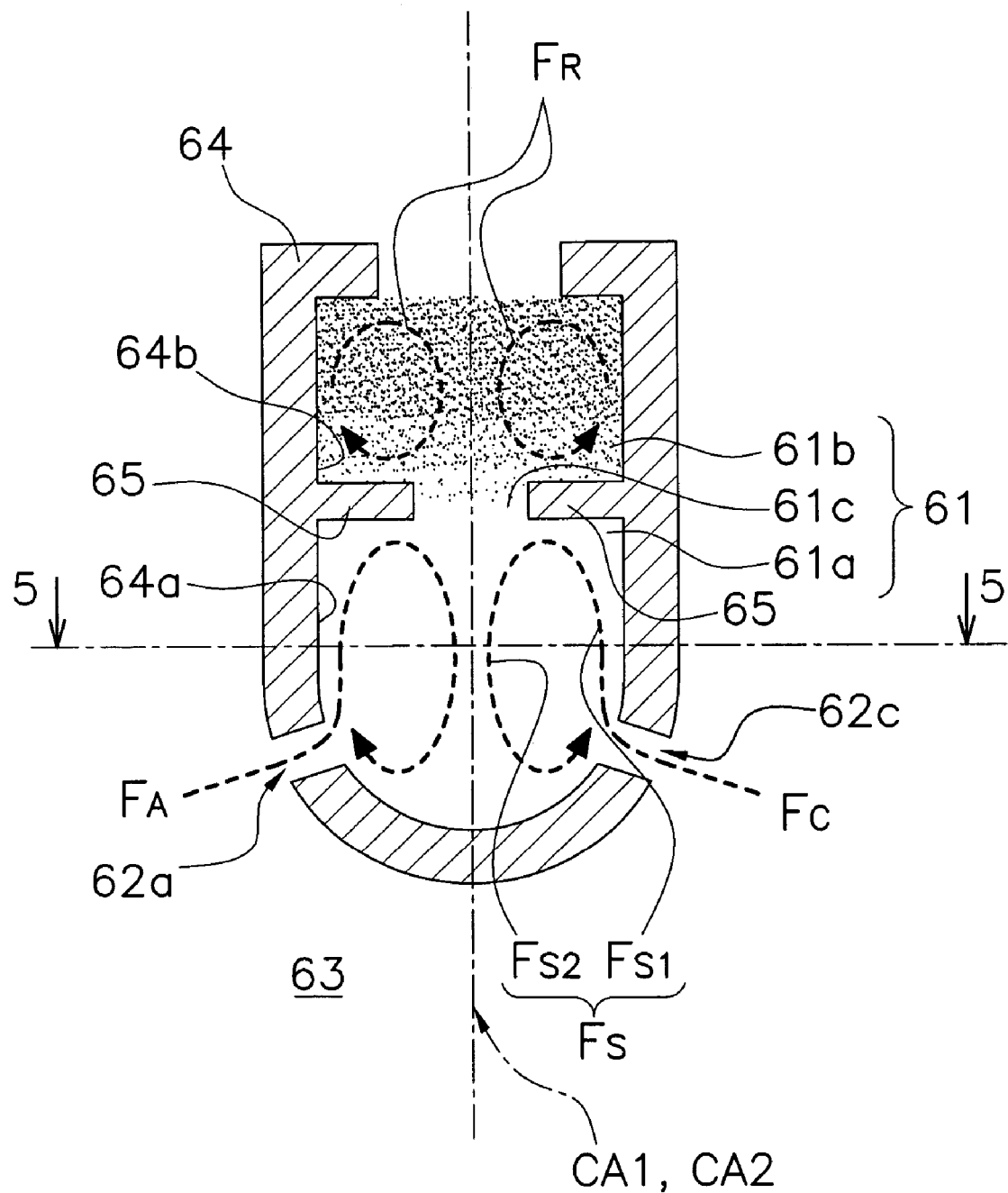
FIG. 4 is an enlarged cross sectional view of the auxiliary combustion chamber part of the internal combustion engine illustrating a fresh air-fuel mixture swirl flow and a residual gas swirl flow formed therein in accordance with the first embodiment of the present invention.

FIG. 4 is an enlarged cross sectional view of the auxiliary combustion chamber part 61 illustrating the swirl flow $F_S$ and a residual gas swirl flow $F_R$ formed therein in accordance with the first embodiment of the present invention. FIG. 4 schematically illustrates a vertical movement of the swirl flow $F_S$ and the residual gas swirl flow $F_R$. In FIGS. 2 and 4, the concentration of the residual gas is indicated by the darkness of the shading (i.e., the darker shade indicates higher concentration of the residual gas).

The fresh air-fuel mixture swirl flow $F_S$ first forms an outer swirl flow $F_{S1}$ that rises upward from the first communicating passages 62a to 62d to a portion where the distal end portion 29a of the spark plug 29 is disposed as shown in FIG. 4. This swirl flow $F_S$ is guided in the direction of the first center axis CA1 near the distal end portion 29a of the spark plug 29 disposed at a top part of the first auxiliary combustion chamber 61a. The swirl flow $F_S$ then forms an inner swirl flow $F_{S2}$ that swirls near the first center axis CA1 while descending as shown in FIG. 4. In other words, the swirl flow $F_S$ in the first auxiliary combustion chamber 61a is guided toward the first center axis CA1 near the baffle plate 65. The swirl flow $F_S$ then descends while swirling near the first center axis CA1. The swirl flow $F_S$ is guided toward the inner peripheral surface 64a near the hemispherical bottom down below, and rises again while swirling around the inner peripheral surface 64a.

Figure 5:
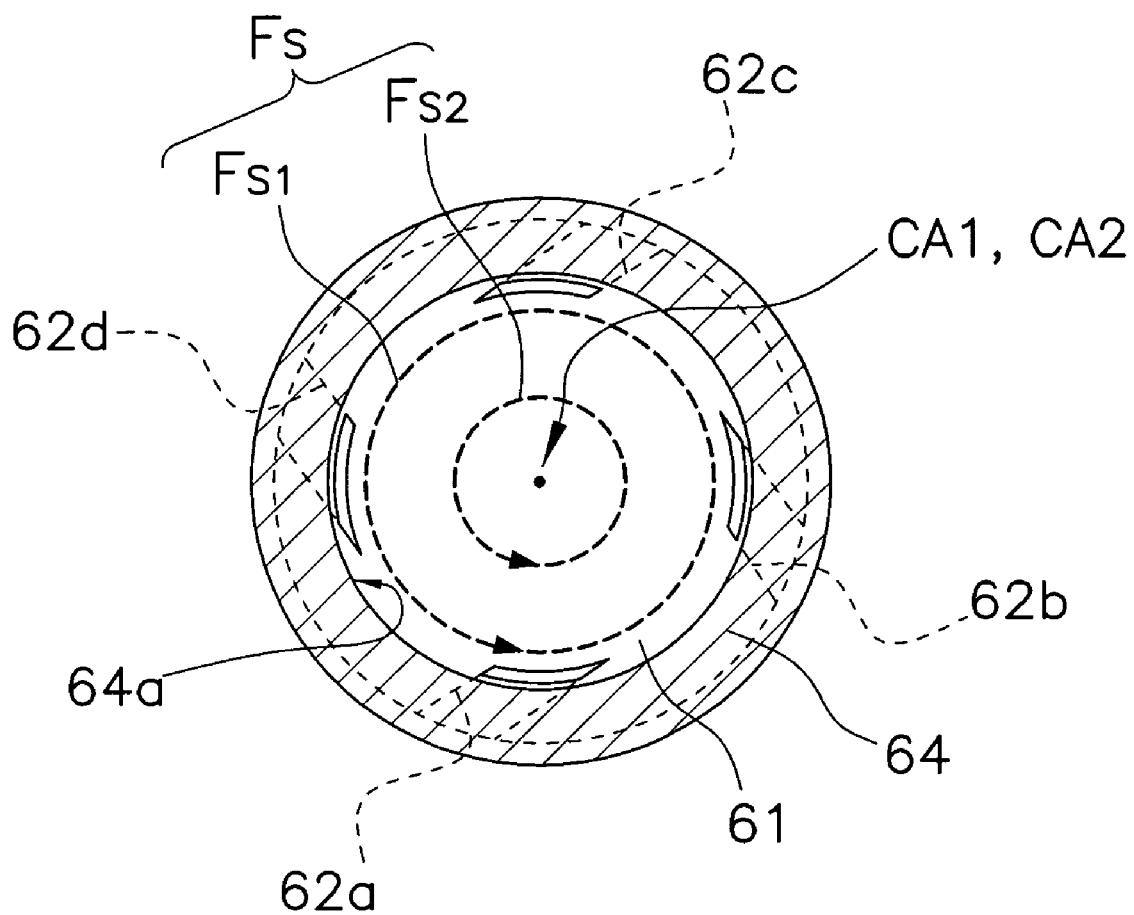
FIG. 5 is an enlarged cross sectional view of the auxiliary combustion chamber part of the internal combustion engine taken along a section line 5—5 in FIG. 4 illustrating the fresh air-fuel mixture swirl flow formed in a first auxiliary combustion chamber in accordance with the first embodiment of the present invention.
Figure 6:
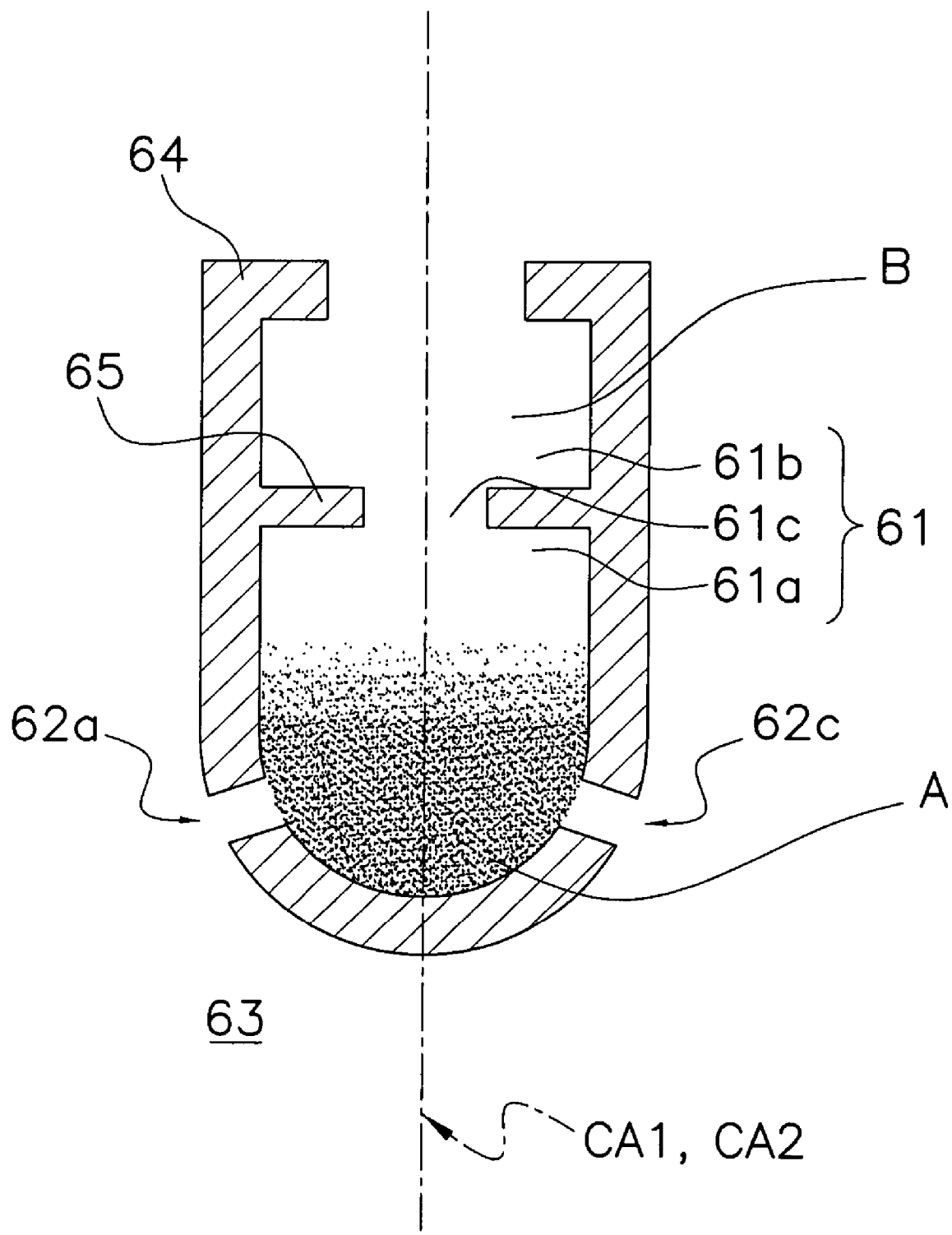
FIG. 6 is an enlarged cross sectional view of the auxiliary combustion chamber part of the internal combustion engine illustrating distribution of turbulence in the auxiliary combustion chamber part in accordance with the first embodiment of the present invention.

FIG. 5 illustrates a simplified circular movement of the swirl flow $F_S$ viewed perpendicular to the first center axis CA1 of the auxiliary combustion chamber part 61. FIG. 6 is an enlarged cross sectional view of the auxiliary combustion chamber part 61 illustrating distribution of turbulence in the auxiliary combustion chamber part 61 in accordance with the first embodiment of the present invention. In FIG. 6, strength of turbulence is indicated by darkness of the shading (i.e., the darker shade indicates more turbulence).

As shown in FIG. 5, the outer swirl flow $F_{S1}$ swirls generally along the inner peripheral surface 64a of the auxiliary combustion chamber wall 64 and the inner swirl flow $F_{S2}$ swirls near the first center axis CA1. Thus, the outer swirl flow $F_{S1}$ of the swirl flow $F_S$ rising upward and the inner swirl flow $F_{S2}$ of the swirl flow $F_S$ descending downward are formed substantially symmetrical to the first center axis CA1, which provides stability to the swirl flow $F_S$ in the first auxiliary combustion chamber 61a. However, as seen in FIG. 6, there will be strong turbulence created in a region A of the first auxiliary combustion chamber 61a that is closer to the first communicating passages 62a to 62d. On the other hand, there will be less turbulence in a region B in the second auxiliary combustion chamber 61b that is further away from the first communicating passages 62a to 62d.

The residual gas in the first auxiliary combustion chamber 61a at this point is pushed by the rising fresh air-fuel mixture swirl flow $F_S$ through the second communicating passage 61c and into the second auxiliary combustion chamber 61b. The residual gas pushed into the second auxiliary combustion chamber 61b swirls around an inner peripheral surface 64b of the auxiliary combustion chamber wall 64 of the second auxiliary combustion chamber 61b while rising to form the residual gas swirl flow $F_R$ as shown in FIG. 4. The residual gas swirl flow $F_R$ is guided toward the second center axis CA2 near a top portion of the auxiliary combustion chamber wall 64. The residual gas swirl flow $F_R$ swirls near the second center axis CA2 while descending. Near the baffle plate 65, the residual gas swirl flow $F_R$ is guided toward the inner peripheral surface 64b after which the residual gas swirl flow $F_R$ swirls around the inner peripheral surface 64b while rising again. As a result, the residual gas in the first auxiliary combustion chamber 61a moves to the second auxiliary combustion chamber 61b and swirls inside the second auxiliary combustion chamber 61b.

When viewed in the direction perpendicular to the second center axis CA2, the circular movement of the residual gas swirl flow $F_R$ is substantially the same as the circular movement of the swirl flow $F_S$ shown in FIG. 5. In other words, the residual gas swirl flow $F_R$ consists of an outer swirl flow around the inner peripheral surface 64b and an inner swirl flow that swirls near the second center axis CA2. Thus, the rising swirl flow and descending swirl flow of the residual gas swirl flow $F_R$ are formed symmetrically with respect to the second center axis CA2 which provides stability to the residual gas swirl flow $F_R$.

With the structure of the auxiliary combustion chamber part 61 of the first embodiment, the swirl flow $F_S$ of the fresh air-fuel mixture does not pass through the second auxiliary combustion chamber 61b where the residual gas is remained. Therefore, the fresh air-fuel mixture introduced into the auxiliary combustion chamber part 61 is prevented to be mixed with the residual gas in the second auxiliary combustion chamber 61b. In other words, gas in the auxiliary combustion chamber part 61 is stratified into two layers consisting of the residual gas in the second auxiliary combustion chamber 61b and the fresh air-fuel mixture in the first auxiliary combustion chamber 61a. Accordingly, the air-fuel ratio of the first auxiliary combustion chamber 61a is substantially equal to the air-fuel ratio of the fresh air-fuel mixture in the main combustion chamber 63. Therefore, ignition in the auxiliary combustion chamber part 61 is stabilized, and thus, combustion in the auxiliary combustion chamber part 61 is also stabilized.

As mentioned above, the distal end portion 29a of the spark plug 29 is provided in the first auxiliary combustion chamber 61a. Therefore, the fresh air-fuel mixture in the first auxiliary combustion chamber 61a is spark-ignited by the spark plug 29. Because of the swirl flow $F_S$, the spark-ignited fresh air-fuel mixture quickly reaches the first communicating passages 62a to 62d as a flame. Once the flame has reached the first communicating passages 62a to 62d, the flame radiates out in a torch shape from the first auxiliary combustion chamber 61a to the main combustion chamber part 63 through the first communicating passages 62a to 62d. Since the first communicating passages 62a to 62d are provided in a portion of the auxiliary combustion chamber part 61 that is closer to the main combustion chamber part 63 with respect to the spark plug 29, the flame radiates out from the first auxiliary combustion chamber 61a toward the main combustion chamber part 63 (in a direction slanting downwardly in FIG. 1). In other words, the flame efficiently radiates out from the auxiliary combustion chamber part 61 to the main combustion chamber part 63. Since the spark-ignited flame quickly reaches the first communicating passages 62a to 62d, it takes less time from the ignition of the fresh air-fuel mixture in the first auxiliary combustion chamber 61a until the flame radiates out to the main combustion chamber part 63. In other words, time required from the ignition to combustion in the first auxiliary combustion chamber 61a can be shortened.

If the auxiliary combustion chamber part 61 is not provided with the baffle plate 65 (in other words, if the auxiliary combustion chamber part 61 is not divided into the first and second auxiliary combustion chambers 61a and 61b), then the fresh air-fuel mixture introduced from the main combustion chamber 63 through the first communicating passages 62a to 62d is promoted to mix with the residual gas inside the auxiliary combustion chamber part 61. In such case, there is almost no difference in air-fuel ratio between a region in the auxiliary combustion chamber part 61 that is further away from the first communicating passages 62a to 62d and a region in the auxiliary combustion chamber part 61 that is closer to the first communicating passages 62a to 62d. Accordingly, since the air-fuel ratio in the auxiliary combustion chamber part 61 becomes substantially richer than the air-fuel ratio of the fresh air-fuel mixture in the main combustion chamber 63. Therefore, ignition in the auxiliary combustion chamber part 61 becomes unstable, and combustion in the auxiliary combustion chamber part 61 also becomes unstable.

Accordingly, with the internal combustion engine 1 of the first embodiment, when the fresh air-fuel mixture is introduced from the main combustion chamber part 63 into the auxiliary combustion chamber part 61 during the compression stroke through the first communicating passages 62a to 62d, the residual gas in the first auxiliary combustion chamber 61a moves to the second auxiliary combustion chamber 61b, and the fresh air-fuel mixture is distributed to the first auxiliary combustion chamber 61a and the second communicating passage 61c. Accordingly, the gas in the auxiliary combustion chamber part 61 is stratified into two layers consisting of the residual gas in the second auxiliary combustion chamber 61b and the fresh air-fuel mixture in the first auxiliary combustion chamber 61a. Also, since the distal end portion 29a of the spark plug 29 is provided in the first auxiliary combustion chamber 61a, the fresh air-fuel mixture in the first auxiliary combustion chamber 61a is ignited.

Thus, ignition in the auxiliary combustion chamber part 61 is stabilized because the gas in the auxiliary combustion chamber part 61 is stratified into two layers consisting of the residual gas in the second auxiliary combustion chamber 61b and the fresh air-fuel mixture in the first auxiliary combustion chamber 61a, and the fresh air-fuel mixture is ignited by the distal end portion 29a of the spark plug 29.

Moreover, the first communicating passages 62a to 62d are configured and arranged such that the main combustion chamber part 63 and the first auxiliary combustion chamber 61a are fluidly communicated through the first communicating passages 62a to 62d. The first communicating passages 62a to 62d are formed in portions of the auxiliary combustion chamber wall 64 that are offset with respect to the first center axis CA1 of the first auxiliary combustion chamber 61a in a cross sectional view perpendicular to the cylinder axis (not shown). The first communicating passages 62a to 62d are inclined with respect to the radial direction R of the first auxiliary combustion chamber 61a (see FIG. 3). A cross section of the first auxiliary combustion chamber 61a taken perpendicular to the first center axis CA1 is substantially circular. As a result, the first communicating passages 62a to 62d cause the fresh air-fuel mixture introduced from the main combustion chamber part 63 into the first auxiliary combustion chamber 61a to swirl around the inner peripheral surface 64a of the first auxiliary combustion chamber 61a forming the swirl flow $F_S$ of fresh air-fuel mixture (see FIGS. 3 to 5).

Because the first communicating passages 62a to 62d are configured and arranged to form the swirl flow $F_S$ of fresh air-fuel mixture in the first auxiliary combustion chamber 61a, there is greater turbulence in the first auxiliary combustion chamber 61a, and combustion occurs faster in the first auxiliary combustion chamber 61a. Thus, combustion is stabilized in the auxiliary combustion chamber part 61.

The volume of the first auxiliary combustion chamber 61a is greater than the volume of the second auxiliary combustion chamber 61b. More specifically, the auxiliary combustion chamber part 61 is configured and arranged such that the auxiliary chamber volumetric ratio is substantially equal to the effective compression ratio of the internal combustion engine 1.

Because the auxiliary chamber volumetric ratio is substantially equal to value as the effective compression ratio of the internal combustion engine 1, the amount of the fresh air-fuel mixture flowing from the first auxiliary combustion chamber 61a into the second auxiliary combustion chamber 61b through the second communicating passage 61c can be kept low. The discharge of unburned fuel is also suppressed.

In the first embodiment of the present invention, the baffle plate 65 divides the auxiliary combustion chamber part 61 into the first auxiliary combustion chamber 61a and the second auxiliary combustion chamber 61b. Accordingly, cooling loss in the auxiliary combustion chamber part 61 is reduced, and thus, decrease in the combustion rate in the auxiliary combustion chamber part 61 is reduced. As a result, ignition in the auxiliary combustion chamber part 61 is stabilized.

The baffle plate 65 in the first embodiment is arranged as a generally plate shaped member. Therefore, the baffle plate 65 can be formed easily. Also, the second communicating passage 61c is formed by the open portion in the baffle plate 65. Therefore, the second communicating passage 61c is also formed easily. Although the baffle plate 65 is illustrated as being integrally formed with the auxiliary combustion chamber wall 64 as a one piece, unitary member in the first embodiment of the present invention, it will be apparent to those skilled in the art from this disclosure that the baffle plate 65 can be formed as a separate element and fixedly coupled to the auxiliary combustion chamber wall 64.

The first auxiliary combustion chamber 61a in the first embodiment has an axially symmetrical shape about the first center axis CA1. Also, the second auxiliary combustion chamber 61b has an axially symmetrical shape about the second center axis CA2. Therefore, the fresh air-fuel mixture swirl flow $F_S$ in the first auxiliary combustion chamber 61a and the residual gas swirl flow $F_R$ in the second auxiliary combustion chamber 61b are axially symmetrical with respect to the first center axis CA1 and the second center axis CA2. Thus, the swirl flow $F_S$ of the fresh air-fuel mixture and the swirl flow $F_R$ of the residual gas are stable with little cycle fluctuation in each flow.

Because the swirl flow $F_S$ of the fresh air-fuel mixture and the swirl flow $F_R$ of the residual gas are thus individually formed stably, mixing of the fresh air-fuel mixture and the residual gas is reduced. Therefore, the gas in the auxiliary combustion chamber part 61 is stratified into two layers consisting of the residual gas in the second auxiliary combustion chamber 61b and the fresh air-fuel mixture in the first auxiliary combustion chamber 61a.

The distal end portion 29a of the spark plug 29 is disposed near the first center axis CA1 of the first auxiliary combustion chamber 61a. Therefore, the fresh air-fuel mixture is ignited at a location where the swirl flow $F_S$ of the fresh air-fuel mixture is stabilized.

Although the first auxiliary combustion chamber 61a preferably has a substantially cylindrical shape with the first center axis CA1, the shape of the first auxiliary combustion chamber 61a is not limited to this arrangement. Likewise, although the second auxiliary combustion chamber 61b preferably has a substantially cylindrically shaped with the second center axis CA2, the shape of the second auxiliary combustion chamber 61b is not limited to this arrangement.

When the fresh air-fuel mixture is introduced from the main combustion chamber part 63 into the auxiliary combustion chamber part 61 through the first communicating passages 62a to 62d during the compression stroke, the fresh air-fuel mixture may be distributed to only the first auxiliary combustion chamber 61a instead of the first auxiliary combustion chamber 61a and the second communicating passage 61c as explained above. Moreover, the position where the distal end portion 29a of the spark plug 29 is not limited to the position shown in FIGS. 1 and 2. Rather, the distal end portion 29a of the spark plug 29 can be disposed other positions in the first auxiliary combustion chamber 61a or in the second communicating passage 61c.

SECOND EMBODIMENT

Figure 7:
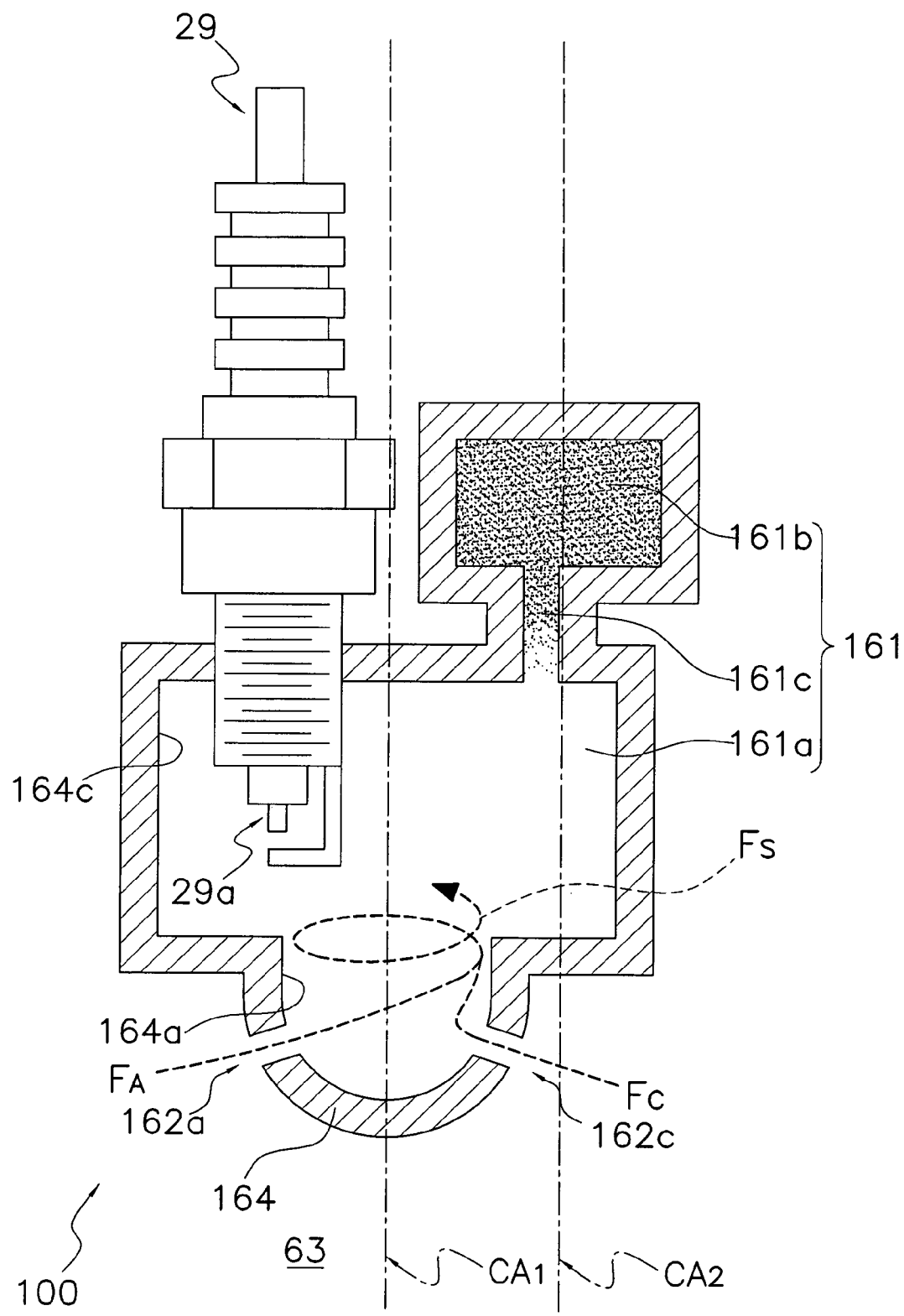
FIG. 7 is an enlarged cross sectional view of an auxiliary combustion chamber part of an internal combustion engine coupled with a spark plug in accordance with a second embodiment of the present invention.
Figure 8:
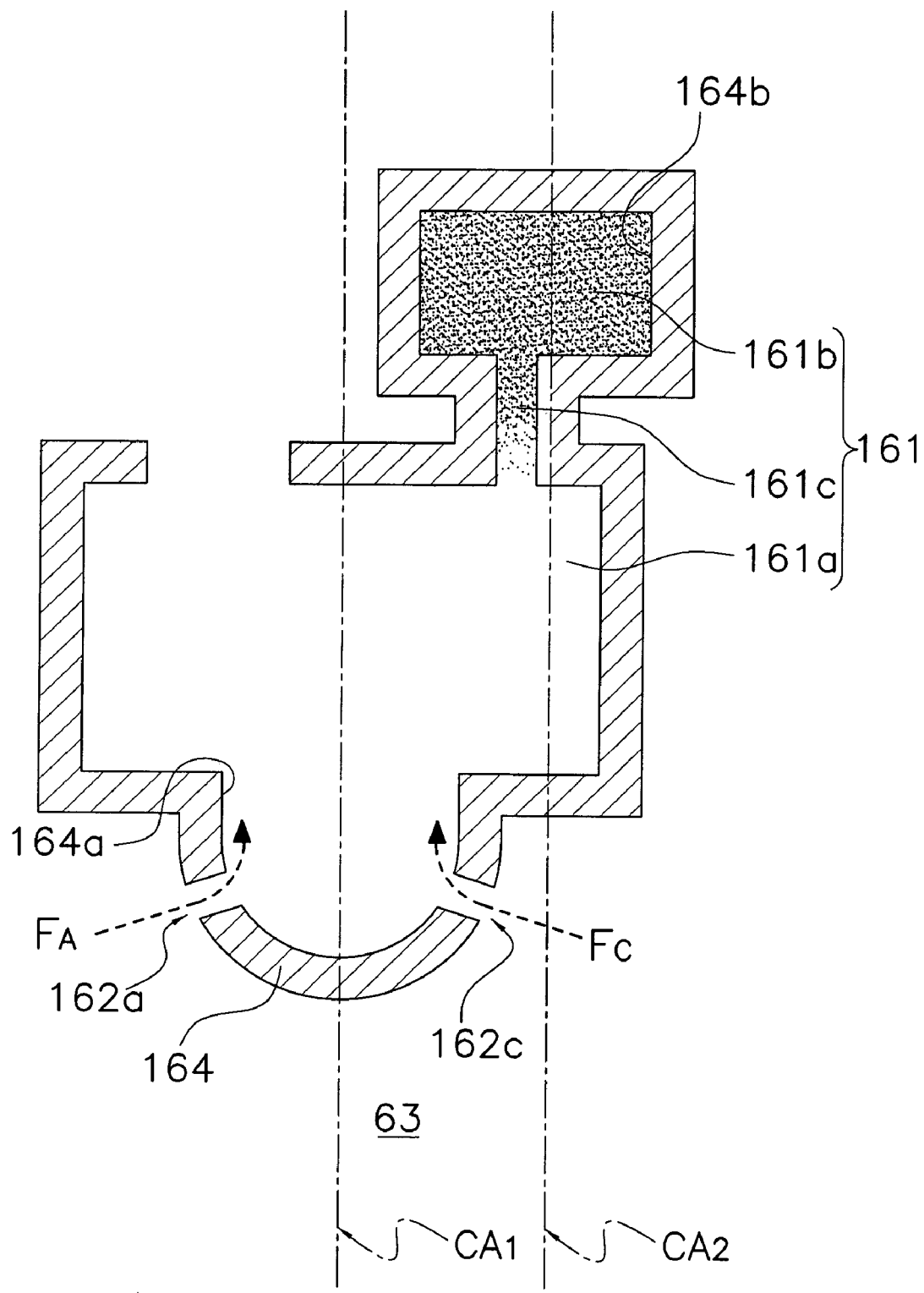
FIG. 8 is an enlarged cross sectional view of the auxiliary combustion chamber part of the internal combustion engine illustrating distribution of residual gas in the auxiliary combustion chamber part in accordance with the second embodiment of the present invention.

Referring now to FIGS. 7 and 8, an internal combustion engine 100 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The internal combustion engine 100 of the second embodiment differs from the internal combustion engine 1 of the first embodiment in that an auxiliary combustion chamber part 161 is used in the second embodiment instead of the auxiliary combustion chamber part 61 of the first embodiment.

Detailed Structure of Auxiliary Combustion Chamber Part

FIG. 7 is an enlarged cross sectional view of the auxiliary combustion chamber part 161 coupled with the spark plug 29 in accordance with the second embodiment. FIG. 8 is an enlarged cross sectional view of the auxiliary combustion chamber part 161 in which the spark plug 29 is omitted for better explaining the structure of the auxiliary combustion chamber part 161. The cross sectional views shown in FIGS. 7 and 8 are taken along the first center axis CA1 of the auxiliary combustion chamber part 161. In FIGS. 7 and 8, concentration of residual gas is indicated by the darkness of the shading (i.e., the darker shade indicates higher concentration of the residual gas).

The auxiliary combustion chamber part 161 includes a first auxiliary combustion chamber 161a and a second auxiliary combustion chamber 161b. The first auxiliary combustion chamber 161a and the second auxiliary combustion chamber 161b are fluidly communicated by a second communicating passage 161c. The first auxiliary combustion chamber 161a, the second auxiliary combustion chamber 161b and the second communicating passage 161c are formed by an auxiliary combustion chamber wall 164.

The first auxiliary combustion chamber 161a is provided adjacent to the main combustion chamber part 63, and has a substantially cylindrical portion with the first center axis CA1 as shown in FIG. 7. The first auxiliary combustion chamber 161a also has a hemispherical bottom portion that bulges out downwardly from the cylindrical portion near the first center axis CA1. A cross sectional shape of the first auxiliary combustion chamber 161a taken perpendicular to the first center axis CA1 is preferably substantially circular. Several first communicating passages 162a to 162d are formed in the hemispherical bottom portion of the first auxiliary combustion chamber 161a. The first communicating passages 162a to 162d are configured and arranged to fluidly communicate the first auxiliary combustion chamber 161a with the main combustion chamber 63. The structures of the first communicating passages 162a to 162d are substantially identical to the structures of the first communicating passages 62a to 62d in the first embodiment.

The second auxiliary combustion chamber 161b is disposed adjacent to the first auxiliary combustion chamber 161a in a position further away from the main combustion chamber part 63 with respect to the first auxiliary combustion chamber 161a. The second auxiliary combustion chamber 161b has a substantially cylindrical shape with the second center axis CA2 as seen in FIG. 7.

In the second embodiment of the present invention, the first center axis CA1 of the first auxiliary combustion chamber 161a and the second center axis CA2 of the second auxiliary combustion chamber 161b are offset from each other as shown in FIGS. 7 and 8. A volume of the first auxiliary combustion chamber 161a is greater than a volume of the second auxiliary combustion chamber 161b such that an auxiliary chamber volumetric ratio is substantially the same as the effective compression ratio of the internal combustion engine 100. The auxiliary chamber volumetric ratio is obtained by adding the volume of the first auxiliary combustion chamber 161a and the volume of the second auxiliary combustion chamber 161b, and dividing this sum by the volume of the second auxiliary combustion chamber 161b. The volume of the first auxiliary combustion chamber 161a does not include a volume of a portion of the first auxiliary combustion chamber 161a taken up by the spark plug 29.

The second communicating passage 161c is formed at a bottom portion of the second auxiliary combustion chamber 161b adjacent to the second center axis CA2 as shown in FIGS. 7 and 8. The second communicating passage 161c is configured and arranged to fluidly communicate the first auxiliary combustion chamber 161a with the second auxiliary combustion chamber 161b.

The distal end portion 29a of the spark plug 29 is located inside the first auxiliary combustion chamber 161a in a portion away from the main combustion chamber part 63. Moreover, the distal end portion 29a of the spark plug 29 is spaced apart from an inner peripheral surface 164c of the substantially cylindrical portion of the first auxiliary combustion chamber 161a and from the first center axis CA1 of the first auxiliary combustion chamber 161a. The distal end portion 29a of the spark plug 29 protrudes into the first auxiliary combustion chamber 161a.

Detailed Operation of Auxiliary Combustion Chamber Part

During the compression stroke, the fresh air-fuel mixture is introduced from the main combustion chamber part 63 to the first auxiliary combustion chamber 161a through the first communicating passages 162a to 162d as flows $F_A$ to $F_D$ to form a swirl flow $F_S$ along an inner peripheral surface 164a of the hemispherical bottom portion of the first auxiliary combustion chamber 161a as shown in FIG. 7. The fresh air-fuel mixture forms the swirl flow $F_S$ while rising upward from the first communicating passages 162a to 162d to where the distal end portion 29a of the spark plug 29 is located (see flows $F_A$ and $F_C$ in FIG. 8). The residual gas in the first auxiliary combustion chamber 161a at this point is pushed by the rising fresh air-fuel mixture swirl flow $F_S$ through the second communicating passage 161c and into the second auxiliary combustion chamber 161b. As a result, the residual gas in the first auxiliary combustion chamber 161a moves to the second auxiliary combustion chamber 161b.

The swirl flow $F_S$ of the fresh air-fuel mixture does not pass through the second auxiliary combustion chamber 161b where the residual gas is located. Therefore, the fresh air-fuel mixture introduced into the auxiliary combustion chamber part 161 is prevented to be mixed with the residual gas in the auxiliary combustion chamber part 161. Therefore, gas in the auxiliary combustion chamber part 161 is stratified into two layers consisting of the residual gas in the second auxiliary combustion chamber 161b and the fresh air-fuel mixture in the first auxiliary combustion chamber 161a. Accordingly, the air-fuel ratio of the first auxiliary combustion chamber 161a is substantially equal to the air-fuel ratio of the fresh air-fuel mixture in the main combustion chamber 63. Thus, ignition in the auxiliary combustion chamber part 161 is stabilized, and combustion in the auxiliary combustion chamber part 161 is also stabilized.

The distal end portion 29a of the spark plug 29 is provided to the first auxiliary combustion chamber 161a so that the fresh air-fuel mixture is spark-ignited. Because of the swirl flow $F_S$, the spark-ignited fresh air-fuel mixture quickly reaches the first communicating passages 162a to 162d as a flame. Specifically, because the spark-ignited flame quickly reaches the first communicating passages 162a to 162d, it takes less time from the ignition of the fresh air-fuel mixture in the first auxiliary combustion chamber 161a until the flame radiates out to the main combustion chamber part 63. In other words, time required from ignition to combustion in the first auxiliary combustion chamber 161a is shortened.

With the auxiliary combustion chamber part 161 of the second embodiment, when the fresh air-fuel mixture is introduced from the main combustion chamber part 63 into the auxiliary combustion chamber part 161 during the compression stroke through the first communicating passages 162a to 162d, the residual gas in the first auxiliary combustion chamber 161a moves to the second auxiliary combustion chamber 161b. The fresh air-fuel mixture is distributed to the first auxiliary combustion chamber 161a and the second communicating passage 161c. Accordingly, the gas in the auxiliary combustion chamber part 161 is stratified into two layers consisting of the residual gas in the second auxiliary combustion chamber 161b and the fresh air-fuel mixture in the first auxiliary combustion chamber 161a. Since the distal end portion 29a of the spark plug 29 is provided in the first auxiliary combustion chamber 161a, the fresh air-fuel mixture is ignited.

Thus, ignition in the auxiliary combustion chamber part 161 is stabilized because the gas in the auxiliary combustion chamber part 161 is stratified into two layers consisting of the residual gas and the fresh air-fuel mixture, and the fresh air-fuel mixture is ignited by the distal end portion 29a of the spark plug 29.

The first communicating passages 162a to 162d are configured and arranged such that the first auxiliary combustion chamber 161a fluidly communicates with the main combustion chamber part 63. As in the first embodiment, the first communicating passages 162a to 162d are offset with respect to the first center axis CA1 of the first auxiliary combustion chamber 161a in a cross sectional view perpendicular to the cylinder axis (not shown). Moreover, the first communicating passages 162a to 162d are inclined with respect to the radial direction R of the first auxiliary combustion chamber 161a (see FIG. 3) with respect to the first center axis CA1. A cross sectional shape of the first auxiliary combustion chamber 161a taken perpendicular to the first center axis CA1 is preferably substantially circular. As a result, the first communicating passages 162a to 162d are configured and arranged to cause the fresh air-fuel mixture introduced from the main combustion chamber part 63 into the auxiliary combustion chamber part 161 to swirl around the inner peripheral surface 164a of the first auxiliary combustion chamber 161a forming the swirl flow $F_S$ of the fresh air-fuel mixture in the first auxiliary combustion chamber 161a (see FIG. 7).

Because the first communicating passages 162a to 162d are configured and arranged to form the swirl flow $F_S$ of the fresh air-fuel mixture in the first auxiliary combustion chamber 161a, there is greater turbulence in the first auxiliary combustion chamber 161a, and combustion occurs faster in the first auxiliary combustion chamber 161a. Accordingly, combustion is stabilized in the auxiliary combustion chamber part 161.

The volume of the first auxiliary combustion chamber 161a is greater than the volume of the second auxiliary combustion chamber 161b. More specifically, the auxiliary chamber volumetric ratio is substantially the same value as the effective compression ratio of the internal combustion engine 100.

Because the auxiliary chamber volumetric ratio is thus substantially the same value as the effective compression ratio of the internal combustion engine 100, the amount of fresh air-fuel mixture flowing from the first auxiliary combustion chamber 161a into the second auxiliary combustion chamber 161b through the second communicating passage 161c can be kept to the required minimum amount. The discharge of unburned fuel is also suppressed.

Although the first auxiliary combustion chamber 161a is explained as having a substantially cylindrical portion with the first center axis CA1 and the hemispherical bottom portion that bulges out, the first auxiliary combustion chamber 161a may instead be formed as substantially cylindrical with the first center axis CA1. Moreover, the shape of the first auxiliary combustion chamber 161a is not limited to such arrangement. Likewise, although the second auxiliary combustion chamber 161b preferably has a substantially cylindrical shape with the second center axis CA2, the shape of the second auxiliary combustion chamber 161b is not limited to this arrangement.

When the fresh air-fuel mixture is introduced from the main combustion chamber part 63 into the auxiliary combustion chamber part 161 through the first communicating passages 162a to 162d during the compression stroke, the fresh air-fuel mixture may be distributed to only the first auxiliary combustion chamber 161a instead of the first auxiliary combustion chamber 161a and the second communicating passage 161c as explained above. Moreover, the position where the distal end portion 29a of the spark plug 29 is not limited to the position shown in FIG. 7. Rather, the distal end portion 29a of the spark plug 29 can be disposed other positions in the first auxiliary combustion chamber 161a or in the second communicating passage 161c.

THIRD EMBODIMENT

Figure 9:
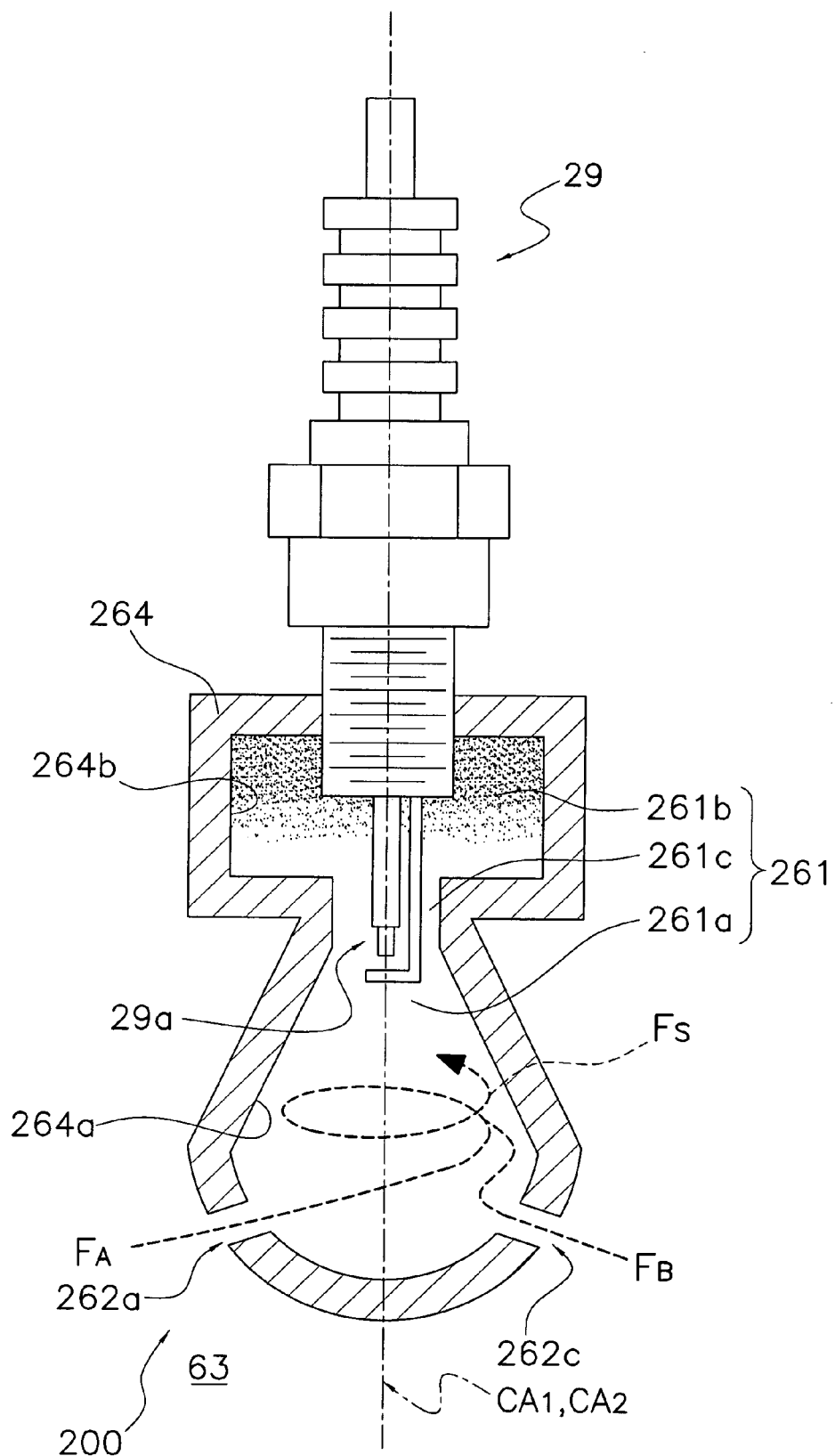
FIG. 9 is an enlarged cross sectional view of an auxiliary combustion chamber part of an internal combustion engine coupled with a spark plug in accordance with a third embodiment of the present invention.
Figure 10:
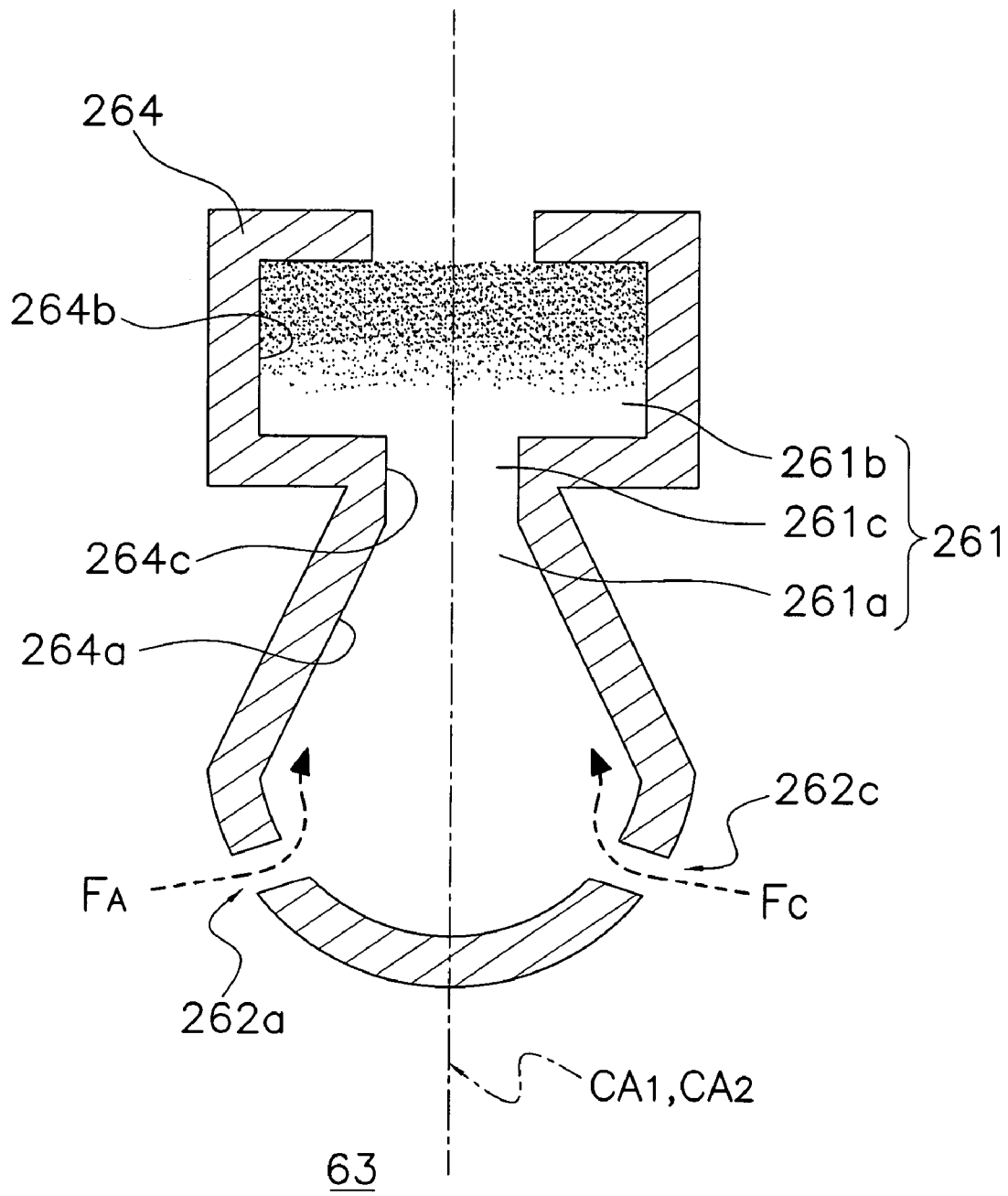
FIG. 10 is an enlarged cross sectional view of the auxiliary combustion chamber part of the internal combustion engine illustrating distribution of residual gas in the auxiliary combustion chamber part in accordance with the third embodiment of the present invention.
Figure 11:
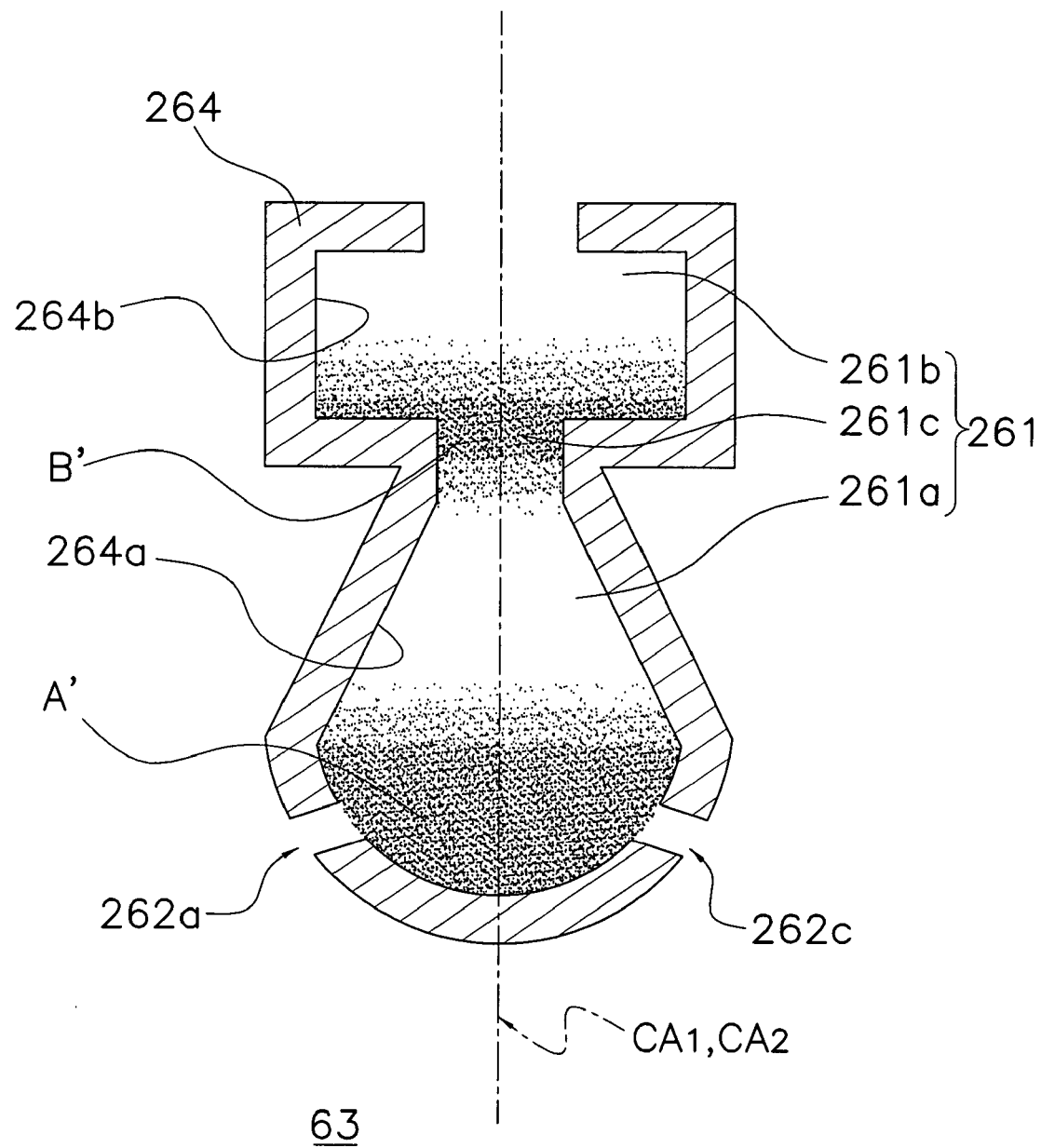
FIG. 11 is an enlarged cross sectional view of the auxiliary combustion chamber part of the internal combustion engine illustrating distribution of turbulence in the auxiliary combustion chamber part in accordance with the third embodiment of the present invention.

Referring now to FIGS. 9 to 11, an internal combustion engine 200 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The internal combustion engine 200 of the third embodiment differs from the internal combustion engine 1 of the first embodiment in that an auxiliary combustion chamber part 261 is used in the third embodiment instead of the auxiliary combustion chamber part 61 of the first embodiment.

Detailed Constitution of Auxiliary Combustion Chamber Part

FIG. 9 is an enlarged cross sectional view of the auxiliary combustion chamber part 261 coupled with the spark plug 29 in accordance with the third embodiment of the present invention. FIG. 10 is an enlarged cross sectional view of the auxiliary combustion chamber part 261 illustrating distribution of residual gas in the auxiliary combustion chamber part 261 in accordance with the third embodiment of the present invention. In FIG. 10, concentration of the residual gas is indicated by the darkness of the shading (i.e., the darker shade indicates higher concentration of the residual gas). FIG. 11 is an enlarged cross sectional view of the auxiliary combustion chamber part 261 illustrating distribution of turbulence in the auxiliary combustion chamber part 261 in accordance with the third embodiment of the present invention. In FIG. 11, strength of the turbulence is indicated by the darkness of the shading (i.e., the darker shade indicates stronger turbulence).

As seen in FIG. 9, the auxiliary combustion chamber part 261 has a first auxiliary combustion chamber 261a and a second auxiliary combustion chamber 261b. The first auxiliary combustion chamber 261a and the second auxiliary combustion chamber 261b are fluidly communicated with each other by a second communicating passage 261c. The first auxiliary combustion chamber 261a, the second auxiliary combustion chamber 261b and the second communicating passages 261c are formed by an auxiliary combustion chamber wall 264.

The first auxiliary combustion chamber 261a is provided adjacent to the main combustion chamber part 63. The first auxiliary combustion chamber 261a has a cross sectional shape that is substantially circular in a plane perpendicular to the first center axis CA1 of the first auxiliary combustion chamber 261a. More specifically, in the third embodiment of the present invention, the first auxiliary combustion chamber 261a has a substantially conical portion with the first center axis CA1, and a hemispherical bottom portion that bulges out downwardly from the conical portion. The first auxiliary combustion chamber 261a is configured and arranged such that the cross sectional area of a portion closer to the distal end portion 29a of the spark plug 29 is smaller than the cross sectional area of the portion closer to the main combustion chamber part 63 as seen in FIG. 9. In other words, the radius of the conical portion of the first auxiliary combustion chamber 261a decreases as it moves toward the second communicating passage 261c.

In the third embodiment of the present invention, the auxiliary combustion chamber part 261 is preferably disposed and oriented with respect to the main combustion chamber part 63 such that the first center axis CA1 of the first auxiliary combustion chamber 261a substantially coincides a cylinder center axis (not shown). In other words, in the third embodiment of the present invention, the first center axis CA1 substantially coincides to an axis linking the distal end portion 29a of the spark plug 29 and a volumetric center point of the main combustion chamber part 63 at top dead center. Thus, the first auxiliary combustion chamber 261a is configured and arranged such that the cross sectional area of a portion closer to the distal end portion 29a of the spark plug 29 is smaller than the cross sectional area of the portion closer to the main combustion chamber part 63 in a plane perpendicular to the first center axis CA1 as seen in FIG. 9. When the auxiliary combustion chamber part 261 is disposed and oriented such that the first center axis CA1 does not coincides to the cylinder center axis of the internal combustion engine 200, the first auxiliary combustion chamber 261a of the present invention is arranged such that a portion adjacent to the first communicating passages 262a to 262d has a cross sectional area that is larger than a cross sectional area of a portion adjacent to the ignition component in a plane perpendicular to an axis linking the distal end portion 29a of the spark plug 29 and a volumetric center point of the main combustion chamber part 63 at top dead center.

The first communicating passages 262a to 262d are formed in the hemispherical bottom portion of the first auxiliary combustion chamber 261a. The first communicating passages 262a to 262d are configured and arranged such that the main combustion chamber part 63 and the first auxiliary combustion chamber 261a are fluidly communicated with each other. The structures of the first communicating passages 262a to 262d are substantially identical to the structures of the first communicating passages 62a to 62d in the first embodiment.

The second auxiliary combustion chamber 261b is disposed adjacent to the first auxiliary combustion chamber 261a and further away from the main combustion chamber part 63 than the first auxiliary combustion chamber 261a. The second auxiliary combustion chamber 261b has a substantially cylindrical shape with the second center axis CA2.

In the third embodiment of the present invention, the first center axis CA1 and the second center axis CA2 substantially coincides with each other as shown in FIG. 9. A volume of the first auxiliary combustion chamber 261a is greater than a volume of the second auxiliary combustion chamber 261b. Since the residual gas in the auxiliary combustion chamber part 261 is believed to be compressed at the proportion of the effective compression ratio during the compression stroke, the auxiliary combustion chamber part 261 is configured and arranged such that an auxiliary chamber volumetric ratio is substantially the same value as an effective compression ratio of the internal combustion engine 200. The auxiliary chamber volumetric ratio is obtained by adding the volume of the first auxiliary combustion chamber 261a and the volume of the second auxiliary combustion chamber 261b, and dividing this sum by the volume of the second auxiliary combustion chamber 261b. The volume of the first auxiliary combustion chamber 261a and the volume of the second auxiliary combustion chamber 261b do not include the volume of the portion taken up by the spark plug 29.

As seen in FIG. 9, the second communicating passage 261c is formed at a bottom portion of the second auxiliary combustion chamber 261b near the second center axis CA2. The second communicating passage 261c is configured and arranged to fluidly communicate the first auxiliary combustion chamber 261a with the second auxiliary combustion chamber 261b.

The distal end portion 29a of the spark plug 29 is located near the first center axis CA1 of the first auxiliary combustion chamber 261a and away from the main combustion chamber part 63 in the interior of the first auxiliary combustion chamber 261a. The distal end portion 29a of the spark plug 29 protrudes into the first auxiliary combustion chamber 261a.

Detailed Operation of Auxiliary Combustion Chamber

During the compression stroke, the fresh air-fuel mixture is introduced from the main combustion chamber part 63 to the first auxiliary combustion chamber 261a as flows $F_A$ to $F_D$ to form a swirl flow $F_S$ along an inner peripheral surface 264a of the first auxiliary combustion chamber 261a. The fresh air-fuel mixture forms the swirl flow $F_S$ while rising upward from the first communicating passages 262a to 262d to where the distal end portion 29a of the spark plug 29 is located (see flows $F_A$ and $F_C$ in FIG. 10). The residual gas in the first auxiliary combustion chamber 261a at this point is pushed by the rising fresh air-fuel mixture through the second communicating passage 261c and into the second auxiliary combustion chamber 261b. As a result, the residual gas in the first auxiliary combustion chamber 261a moves to the second auxiliary combustion chamber 261b.

The swirl flow $F_S$ of the fresh air-fuel mixture does not readily pass through the second auxiliary combustion chamber 261b where the residual gas resides. Therefore, the fresh air-fuel mixture introduced into the auxiliary combustion chamber part 261 is prevented to be mixed with the residual gas in the auxiliary combustion chamber part 261. In other words, gas in the auxiliary combustion chamber part 261 is stratified into two layers consisting of the residual gas in the second auxiliary combustion chamber 261b and the fresh air-fuel mixture in the first auxiliary combustion chamber 261a as seen in FIG. 10. Accordingly, the air-fuel ratio of the first auxiliary combustion chamber 261a is substantially equal to the air-fuel ratio of the fresh air-fuel mixture in the main combustion chamber 63. Thus, ignition in the auxiliary combustion chamber part 261 is stabilized, and combustion in the auxiliary combustion chamber part 261 is also stabilized.

With the auxiliary combustion chamber part 261 of the third embodiment, the turbulence is stronger in a region A' near the first communicating passages 262a to 262d as shown in FIG. 11 similarly to the internal combustion engine 1 (see FIG. 6). Also, the swirl flow $F_S$ rises around the inner peripheral surface 264a, whose radius decreases toward a top portion in a region B' near the second communicating passage 261c. Thus, the turbulence is increased by the resulting increase in the flow speed of the swirl flow $F_S$ in the region B' as shown in FIG. 11. On the other hand, as shown in FIG. 11, there is less turbulence in regions in the auxiliary combustion chamber part 261 other than the regions A' and B'.

As shown in FIG. 9, the distal end portion 29a of the spark plug 29 is provided to the first auxiliary combustion chamber 261a so that the fresh air-fuel mixture is spark-ignited in the first auxiliary combustion chamber 261a. Because of the swirl flow $F_S$, the spark-ignited fresh air-fuel mixture quickly reaches the first communicating passages 262a to 262d as a flame. Since the spark-ignited flame quickly reaches the first communicating passages 262a to 262d, it takes less time from the ignition of the fresh air-fuel mixture in the auxiliary combustion chamber part 261 until the flame radiates out to the main combustion chamber part 63. Therefore, time required from ignition to combustion in the first auxiliary combustion chamber 261a can be shortened.

Accordingly, with the internal combustion engine 200 of the third embodiment, when the fresh air-fuel mixture is introduced from the main combustion chamber part 63 into the auxiliary combustion chamber part 261 during the compression stroke through the first communicating passages 262a to 262d, the residual gas in the first auxiliary combustion chamber 261a moves to the second auxiliary combustion chamber 261b, and the fresh air-fuel mixture is distributed to the first auxiliary combustion chamber 261a and the second communicating passage 261c. Accordingly, the gas in the auxiliary combustion chamber part 261 is stratified into two layers consisting of the residual gas in the second auxiliary combustion chamber 261b and the fresh air-fuel mixture in the first auxiliary combustion chamber 261a. Also, since the distal end portion 29a of the spark plug 29 is provided in the first auxiliary combustion chamber 261a, the fresh air-fuel mixture in the first auxiliary combustion chamber 261a is ignited.

Thus, ignition in the auxiliary combustion chamber part 261 is stabilized because the gas in the auxiliary combustion chamber part 261 is stratified into two layers consisting of the residual gas in the second auxiliary combustion chamber 261b and the fresh air-fuel mixture in the first auxiliary combustion chamber 261a, and the fresh air-fuel mixture is ignited by the distal end portion 29a of the spark plug 29.

Moreover, the first communicating passages 262a to 262d are configured and arranged such that the main combustion chamber part 63 and the first auxiliary combustion chamber 261a are fluidly communicated through the first communicating passages 262a to 262d. The first communicating passages 262a to 262d are formed in portions of the auxiliary combustion chamber wall 264 that are offset with respect to the first center axis CA1 of the first auxiliary combustion chamber 261a in a cross sectional view perpendicular to the cylinder axis (not shown). The first communicating passages 262a to 262d are inclined with respect to the radial direction R of the first auxiliary combustion chamber 261a (see FIG. 3). A cross section of the first auxiliary combustion chamber 261a taken perpendicular to the first center axis CA 1 is substantially circular. As a result, the first communicating passages 262a to 262d cause the fresh air-fuel mixture introduced from the main combustion chamber part 63 into the first auxiliary combustion chamber 261a to swirl around the inner peripheral surface 264a of the first auxiliary combustion chamber 261a forming the swirl flow $F_S$ of fresh air-fuel mixture (FIG. 9).

Because the first communicating passages 262a to 262d are configured and arranged to form the swirl flow $F_S$ of fresh air-fuel mixture in the first auxiliary combustion chamber 261a, there is greater turbulence in the first auxiliary combustion chamber 261a, and combustion occurs faster in the first auxiliary combustion chamber 261a. Thus, combustion is stabilized in the auxiliary combustion chamber part 261.

The volume of the first auxiliary combustion chamber 261a is greater than the volume of the second auxiliary combustion chamber 261b. More specifically, the auxiliary combustion chamber part 261 is configured and arranged such that the auxiliary chamber volumetric ratio is substantially equal to the effective compression ratio of the internal combustion engine 200.

Because the auxiliary chamber volumetric ratio is substantially equal to value as the effective compression ratio of the internal combustion engine 200, the amount of the fresh air-fuel mixture flowing from the first auxiliary combustion chamber 261a into the second auxiliary combustion chamber 261b through the second communicating passage 261c can be kept low. The discharge of unburned fuel is also suppressed.

In the third embodiment of the present invention, the first auxiliary combustion chamber 261a is configured and arranged such that the cross sectional area of the portion closer to the distal end portion 29a of the spark plug 29 is smaller than the cross sectional area of the portion closer to the main combustion chamber part 63. In other words, the first auxiliary combustion chamber 261a is configured and arranged such that the cross sectional area thereof increases from the distal end portion 29a of the spark plug 29 in a direction of a movement of ignited flame. As a result, combustion in the first auxiliary combustion chamber 261a is stabilized.

The first auxiliary combustion chamber 261a in the third embodiment includes the substantially conical portion with the first center axis CA1. Accordingly, a surface area of the first auxiliary combustion chamber 261a is reduced, and thus, cooling loss in the first auxiliary combustion chamber 261a is reduced. Also, since the swirl flow $F_S$ flows faster in the first auxiliary combustion chamber 261a, there is greater turbulence of the fresh air-fuel mixture in the first auxiliary combustion chamber 261a. As a result, combustion is accelerated in the first auxiliary combustion chamber 261a and combustion in the auxiliary combustion chamber part 261 is stabilized.

The first auxiliary combustion chamber 261a in the third embodiment has an axially symmetrical shape about the first center axis CA1. Also, the second auxiliary combustion chamber 261b has an axially symmetrical shape about the second center axis CA2. Therefore, the fresh air-fuel mixture swirl flow $F_S$ in the first auxiliary combustion chamber 261a and a residual gas swirl flow in the second auxiliary combustion chamber 261b are axially symmetrical with respect to the first and second center axes CA1 and CA2, respectively. Thus, the swirl flow $F_S$ of the fresh air-fuel mixture and the swirl flow of the residual gas are stable with little cycle fluctuation in each flow.

Because the swirl flow $F_S$ of the fresh air-fuel mixture and the swirl flow of the residual gas are thus individually formed stably, mixing of the fresh air-fuel mixture and the residual gas is reduced. Therefore, the gas in the auxiliary combustion chamber part 261 is stratified into two layers consisting of the residual gas in the second auxiliary combustion chamber 261b and the fresh air-fuel mixture in the first auxiliary combustion chamber 261a.

The distal end portion 29a of the spark plug 29 is disposed near the first center axis CA1 of the first auxiliary combustion chamber 261a. Therefore, the fresh air-fuel mixture is ignited at a location where the swirl flow $F_S$ of the fresh air-fuel mixture is stabilized.

Although the first auxiliary combustion chamber 261a preferably has the substantially conical portion with the first center axis CA1, the shape of the first auxiliary combustion chamber 261a is not limited to this arrangement as long as the structure is such that a cross sectional area of a portion closer to the distal end portion 29a of the spark plug 29 is smaller than a cross sectional area of a portion closer to the main combustion chamber part 63. The second auxiliary combustion chamber 261b preferably has a substantially cylindrical shape with the second center axis CA2, but the shape of the second auxiliary combustion chamber 261b is not limited to this arrangement.

When the fresh air-fuel mixture is introduced from the main combustion chamber part 63 into the auxiliary combustion chamber part 261 through the first communicating passages 262a to 262d during the compression stroke, the fresh air-fuel mixture may be distributed to only the first auxiliary combustion chamber 261a instead of the first auxiliary combustion chamber 261a and the second communicating passage 261c as explained above. Moreover, the position where the distal end portion 29a of the spark plug 29 is not limited to the position shown in FIG. 9. Rather, the distal end portion 29a of the spark plug 29 can be disposed other positions in the first auxiliary combustion chamber 261a or in the second communicating passage 261c.

Although in the first to third embodiment explained above, the fuel injection valve 27 is configured and arranged to inject fuel into the intake port 23, the fuel injection valve 27 can be configured and arranged to inject fuel directly into the main combustion chamber part 63.

With the internal combustion engine 1,100 or 200 in accordance with the present invention, when fresh air-fuel mixture is introduced from the main combustion chamber 63 into the first auxiliary combustion chamber 61a, 161a or 261a during the compression stroke through the first communicating passages 62a to 62d, 162a to 162d, or 262a to 262d, residual gas in the first auxiliary combustion chamber 61a, 161a or 261a can be moved to the second auxiliary combustion chamber 61b, 161b or 261b and remains in the second auxiliary combustion chamber 61b, 161b or 261b. The fresh air-fuel mixture can be distributed in the first auxiliary combustion chamber 61a, 161a or 261a and the second communicating passage 61c, 161c or 261c, or just in the first auxiliary combustion chamber 61a, 161a or 261a. Accordingly, the gas in the auxiliary combustion chamber part 61, 161 or 261 is stratified into two layers consisting of residual gas and fresh air-fuel mixture.

Also, since the spark plug 29 is provided to either the first auxiliary combustion chamber 61a, 161a or 261a or the second communicating passage 61c, 161c or 261c, the ignition plug can ignite the fresh air-fuel mixture. Thus, the ignition in the auxiliary combustion chamber part 61, 161 or 261 can be stabilized.

As used herein to describe the above embodiments, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. An internal combustion engine comprising:
a main combustion chamber part;
an auxiliary combustion chamber part including a first auxiliary combustion chamber disposed adjacent to the main combustion chamber part, the first auxiliary combustion chamber having a first center axis;

a second auxiliary combustion chamber disposed adjacent to the first auxiliary combustion chamber at a position further away from the main combustion chamber part with respect to the first auxiliary combustion chamber, the second auxiliary combustion chamber having a second center axis;

at least one first communicating passage extending between the main combustion chamber part and the first auxiliary combustion chamber so that the main combustion chamber part and the first auxiliary combustion chamber are fluidly communicated;

a second communicating passage extending between the first auxiliary combustion chamber and the second auxiliary combustion chamber so that the first auxiliary combustion chamber and the second auxiliary combustion chamber are fluidly communicated; and an ignition component coupled to the auxiliary combustion chamber part, and configured and arranged to ignite a fresh air-fuel mixture introduced from the main combustion chamber into the first auxiliary combustion chamber through the first communicating passage, the ignition component having a center axis that is substantially parallel to the first and second center axes of the first and second auxiliary combustion chambers.

2. The internal combustion engine as recited in claim 1, further comprising
a divider element disposed between the first auxiliary combustion chamber and the second auxiliary combustion chamber to divide the auxiliary combustion chamber part into the first auxiliary combustion chamber and the second auxiliary combustion chamber.

3. The internal combustion engine as recited in claim 2, wherein
the divider element includes a generally plate shaped member with an opening portion that defines the second communicating passage.

4. The internal combustion engine as recited in claim 1, wherein
the first auxiliary combustion chamber is arranged such that a portion adjacent to the at least one first communicating passage has a cross sectional area that is larger than a cross sectional area of a portion adjacent to the ignition component in a plane perpendicular to an axis linking the ignition component and a volumetric center point of the main combustion chamber part at top dead center.

5. The internal combustion engine as recited in claim 4, wherein
the first auxiliary combustion chamber includes a tapered portion having a substantially conical shape.

6. The internal combustion engine as recited in claim 1, wherein
the first auxiliary combustion chamber has an axially symmetrical shape about the first center axis, and
the at least one first communicating passage is configured and arranged to introduce the fresh air-fuel mixture from the main combustion chamber part into the first auxiliary combustion chamber so that the fresh air-fuel mixture creates a swirling flow in the first auxiliary combustion chamber along an inner peripheral surface of the first auxiliary combustion chamber.

7. The internal combustion engine as recited in claim 6, wherein
the at least one first communicating passage is disposed in a position that is offset from the first center axis in a plane perpendicular to a cylinder axis, and the at least one first communicating passage having a center axis that is inclined with respect to a direction extending radially from the first center axis.

8. The internal combustion engine as recited in claim 1, wherein
the first auxiliary combustion chamber has a volume that is greater than a volume of the second auxiliary combustion chamber.

9. The internal combustion engine as recited in claim 1, wherein
the first auxiliary combustion chamber has an axially symmetrical shape about the first center axis thereof,
the second auxiliary combustion chamber has an axially symmetrical shape about the second center axis thereof with the second center axis substantially coinciding with the first center axis.

10. The internal combustion engine as recited in claim 1, wherein
the first auxiliary combustion chamber has an axially symmetrical shape about the first center axis thereof,
the second auxiliary combustion chamber has an axially symmetrical shape about the second center axis thereof with the second center axis being offset from the first center axis.

11. The internal combustion engine as recited in claim 1, further comprising
an additional first communicating passage extending between the main combustion chamber part and the first auxiliary combustion chamber so that the main combustion chamber part and the first auxiliary combustion chamber are fluidly communicated,
the at least one first communicating passage and the additional first communicating passage being configured and arranged to introduce the fresh air-fuel mixture from the main combustion chamber into the first auxiliary combustion chamber so that the fresh air-fuel mixture creates a swirling flow along an inner peripheral surface of the first auxiliary combustion chamber.

12. The internal combustion engine as recited in claim 9, wherein the ignition component is disposed adjacent to the first center axis of the first auxiliary combustion chamber.

13. The internal combustion engine as recited in claim 10, wherein the ignition component is disposed in the first auxiliary combustion chamber at a position that is spaced apart from the first center axis and from an inner peripheral surface of the first auxiliary combustion chamber.

14. The internal combustion engine as recited in claim 1, wherein the ignition component is disposed in one of the first auxiliary combustion chamber and the second communicating passage.

15. An internal combustion engine comprising:
a main combustion chamber part;
an auxiliary combustion chamber part including
a first auxiliary combustion chamber disposed adjacent to the main combustion chamber part;
a second auxiliary combustion chamber disposed adjacent to the first auxiliary combustion chamber at a position further away from the main combustion chamber part with respect to the first auxiliary combustion chamber;
at least one first communication passage extending between the main combustion chamber part and the first auxiliary combustion chamber so that the main combustion chamber art and the first auxiliary combustion chamber are fluidly communicated;

a second communicating passage extending between the first auxiliary combustion chamber and the second auxiliary combustion chamber so that the first auxiliary combustion chamber and the second auxiliary combustion chamber are fluidly communicated; and an ignition component coupled to the auxiliary combustion chamber part, and configured and arranged to ignite a fresh air-fuel mixture introduced from the main combustion chamber into the first auxiliary combustion chamber through the first communicating passage, the first auxiliary combustion chamber having a volume that is greater than a volume of the second auxiliary combustion chamber, the auxiliary combustion chamber part being arranged such that an auxiliary chamber volumetric ratio is substantially equal to an effective compression ratio of the internal combustion engine, the auxiliary chamber volumetric ratio being defined by dividing a sum of the volume of the first auxiliary combustion chamber and the volume of the second auxiliary combustion chamber by the volume of the second auxiliary combustion chamber.

16. An internal combustion engine comprising:

main combustion chamber means for generating a main combustion of a fresh air-fuel mixture;

first auxiliary combustion chamber means for generating a preliminary combustion of the fresh air-fuel mixture to torch ignite the fresh air-fuel mixture in the main combustion chamber means, the first auxiliary combustion chamber means having a first center axis;

second auxiliary combustion chamber means for accumulating residual gas from the preliminary combustion in the first auxiliary combustion chamber means, the second auxiliary combustion chamber means having a second center axis;

fresh air-fuel mixture introducing means for introducing the fresh air-fuel mixture into the auxiliary combustion chamber means from the main combustion chamber means; and igniting means for igniting a fresh air-fuel mixture introduced from the main combustion chamber means into the first auxiliary combustion chamber means, the igniting means having a center axis that is substantially parallel to the first and second center axes of the first and second auxiliary combustion chamber means.

* * * * *